US012763986B2

(12) United States Patent
Zhang

(10) Patent No.: US 12,763,986 B2
(45) Date of Patent: Oct. 13, 2026

(54) PROCESS CONTROL METHOD PERFORMED BY A COMMON SERVICE ENTITY

(71) Applicant: BOE TECHNOLOGY GROUP CO., LTD., Beijing (CN)

(72) Inventor: Qian Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 449 days.

(21) Appl. No.: 18/273,994

(22) PCT Filed: Jan. 21, 2022

(86) PCT No.: PCT/CN2022/073216
§ 371 (c)(1),
(2) Date: Jul. 25, 2023

(87) PCT Pub. No.: WO2022/161283
PCT Pub. Date: Aug. 4, 2022

(65) Prior Publication Data

US 2025/0168033 A1 May 22, 2025

(30) Foreign Application Priority Data

Jan. 26, 2021 (CN) ........................ 202110105811.8

(51) Int. Cl.
*H04L 12/28* (2006.01)
*G06F 9/50* (2006.01)
*G16Y 40/00* (2020.01)

(52) U.S. Cl.
CPC ........ *H04L 12/2827* (2013.01); *G06F 9/5077* (2013.01); *G16Y 40/00* (2020.01)

(58) Field of Classification Search
CPC .... H04L 12/2827; G06F 9/5077; G16Y 40/00
See application file for complete search history.

(56) References Cited

U.S. PATENT DOCUMENTS 10,558,323 B1 2/2020 Von Dehsen et al.
2021/0075635 A1* 3/2021 Hurewitz ........... H04L 12/4625

FOREIGN PATENT DOCUMENTS

CN 102914023 A 2/2013
CN 105007206 A 10/2015
(Continued)

OTHER PUBLICATIONS

The First Office Action issued in the corresponding Chinese Application No. 2021101058118, dated Apr. 15, 2026.

*Primary Examiner* — Suraj M Joshi
(74) *Attorney, Agent, or Firm* — Chiwin Law LLC

(57) ABSTRACT

The present disclosure relates to a process control method performed by a common service entity, a process control method performed by an application entity, and a process control method for Internet of Things. Wherein, the process control method performed by the common service entity includes: receiving a request to create an advanced state resource, wherein the advanced state resource is associated with a state resource of a plurality of state resources in a process management resource, and the advanced state resource is linked to at least one action resource of its associated state resource; creating the advanced state resource as a sub-resource of the process management resource according to the request to create an advanced state resource; and processing the process management resource, and setting a value of a current state attribute in the process management resource as an identifier of a state resource associated with the advanced state resource.

20 Claims, 14 Drawing Sheets

(56) References Cited

FOREIGN PATENT DOCUMENTS

| | | | |
|---|---|---|---|
| CN | 105323090 | A | 2/2016 |
| CN | 108107754 | A | 6/2018 |
| CN | 109026558 | A | 12/2018 |
| CN | 109752960 | A | 5/2019 |
| CN | 111650840 | A | 9/2020 |

* cited by examiner

PROCESS CONTROL METHOD PERFORMED BY A COMMON SERVICE ENTITY

CROSS-REFERENCE TO RELATED APPLICATIONS

This application is a U.S. National Phase Entry of International Application No. PCT/CN2022/073216 filed on Jan. 21, 2022, designating the United States of America and claiming priority to Chinese Patent Application No. 202110105811.8, filed on Jan. 26, 2021, which is hereby incorporated by reference herein in its entirety, as a part of the present application.

TECHNICAL FIELD

The present disclosure relates to a process control method performed by a common service entity, a process control method performed by an application entity, and a process control method, an electronic device, a computer-readable medium and a system for Internet of Things.

BACKGROUND

The technology of Internet of Things (IoT) is a networked application and service focusing on machine intelligent interaction. By embedding wireless or wired communication modules and applying processing logic inside an IoT device, it achieves informatization requirements on monitoring, commanding and scheduling, data acquisition and measurement by users.

With the development of IoT technology, there are increasing IoT devices (also referred to as entities) to be connected to IoT. The IoT manages individual IoT devices by constructing an IoT management platform. The IoT management platform generates resources corresponding to IoT devices so as to represent the IoT devices, and controls the IoT devices by operating the resources. An application terminal can subscribe to notifications of changes in various resources through the IoT management platform, so as to achieve further control over the IoT devices.

A smart home platform is a common IoT management platform. Wherein, physical home appliances are connected to the smart home platform in a wired or wireless way, and the smart home platform generates virtual home appliances (i.e., resources) for the physical home appliances, and the application terminal accesses the virtual home appliances through the smart home platform, thereby achieving remote monitoring and controlling of the home appliances.

At present, there is still a need for further improvement in process control of entities and resources in the IoT.

SUMMARY

The embodiments of the present disclosure provide a process control method performed by a common service entity, a process control method performed by an application entity, and a process control method, an electronic device, a computer-readable medium and a system for IoT.

The embodiment of the disclosure provides a process control method performed by a common service entity, comprising: receiving a request to create an advanced state resource, wherein the advanced state resource is associated with a state resource of a plurality of state resources in a process management resource; creating the advanced state resource as a sub-resource of the process management resource according to the request to create an advanced state resource; and processing the process management resource, and setting a value of a current state attribute in the process management resource as an identifier of a state resource associated with the advanced state resource.

For example, the request to create an advanced state resource further includes an advanced control attribute corresponding to the advanced state resource, and the setting the value of the current state attribute in the process management resource as the identifier of the state resource associated with the advanced state resource further comprises: setting the value of the current state attribute in the process management resource as a value corresponding to the advanced state resource in a case that the advanced control attribute indicates that the advanced state resource is enabled; and setting the value of the current state attribute in the process management resource as a value of an initial state attribute in the process management resource in a case that the advanced control attribute indicates that the advanced state resource is disabled.

For example, creating the advanced state resource as the sub-resource of the process management resource further comprises: creating a state resource associated with the advanced state resource as a sub-resource of the advanced state resource, wherein the state resource is linked to at least one action resource through a state action attribute.

For example, creating the advanced state resource as the sub-resource of the process management resource further comprises: creating an identifier of a state resource associated with the advanced state resource as an attribute of the advanced state resource; and creating a subset of action resources included in the state resource associated with the advanced state resource as sub-resources of the advanced state resource.

For example, creating the advanced state resource as the sub-resource of the process management resource further comprises: creating an index pair consisting of an identifier of a state resource associated with the advanced state resource and an identifier of at least one action resource included in the state resource, as an attribute of the advanced state resource.

For example, creating the advanced state resource as the sub-resource of the process management resource further comprises: creating a state status attribute of the advanced state resource, wherein the state status attribute indicates whether the process management resource is processing the advanced state resource; and, creating a state transition attribute of the advanced state resource, wherein the state transition attribute indicates a condition for transition to a continuous state resource and the continuous state resource.

For example, before receiving the request to create an advanced state resource: receiving a request to create a process management resource, and creating the process management resource according to the request to create a process management resource; receiving a request to create a plurality of state resources, and creating the plurality of state resources as sub-resources of the process management resource according to the request to create a plurality of state resources; receiving a request to create at least one action resource, wherein the at least one action resource corresponds to one of the plurality of state resources; and linking the at least one action resource to its corresponding state resource according to the request to create at least one action resource.

For example, at least one action resource of the state resource associated with the advanced state resource includes a target resource and a target operation, and the method further comprises: triggering a target operation for the target resource.

The embodiments of the present disclosure provide a process control method performed by an application entity, comprising: transmitting a request to create an advanced state resource, wherein the advanced state resource is associated with a state resource of a plurality of state resources in a process management resource, and the advanced state resource is linked to at least one action resource of its associated state resource; and receiving a response to create an advanced state resource, wherein the response to create an advanced state resource indicates that the advanced state resource is created as a sub-resource of the process management resource.

For example, the request to create an advanced state resource further includes an advanced control attribute corresponding to the advanced state resource, and the advanced control attribute indicates that the advanced state resource is enabled or disabled.

For example, the request to create an advanced state resource includes an identifier of a state resource associated with the advanced state resource.

For example, the request to create an advanced state resource includes an identifier of a state resource associated with the advanced state resource and a set of identifiers of action resources, wherein the set of identifiers of the action resources is a subset of identifiers of all action resources included in the state resource associated with the advanced state resource.

For example, the request to create an advanced state resource includes an identifier of a state resource associated with the advanced state resource and an identifier of one of a plurality of action resources included in the state resource.

For example, the request to create an advanced state resource further includes a state transition attribute, wherein the state transition attribute indicates a condition for transition to a continuous state resource and the continuous state resource.

For example, before transmitting the request to create an advanced state resource: transmitting a request to create a process management resource; transmitting a request to create a plurality of state resources, wherein the request to create a plurality of state resources indicates that the plurality of state resources are created as sub-resources of the process management resource; and transmitting a request to create at least one action resource, wherein the at least one action resource corresponds to one of the plurality of state resources.

The embodiment of the disclosure provides a process control method for Internet of Things IoT, comprising: transmitting, by an application entity to a common service entity, a request to create a process management resource; receiving, by the common service entity, the request to create a process management resource, and creating the process management resource according to the request to create a process management resource; transmitting, by the application entity to the common service entity, a request to create a plurality of state resources; receiving, by the common service entity, the request to create a plurality of state resources, and creating the plurality of state resources as sub-resources of the process management resource according to the request to create a plurality of state resources; transmitting, by the application entity to the common service entity, a request to create at least one action resource, wherein the at least one action resource corresponds to one of the plurality of state resources; receiving, by the common service entity, the request to create at least one action resource, and linking the at least one action resource to its corresponding state resource according to the request to create at least one action resource; transmitting, by the application entity to the common service entity, a request to create an advanced state resource, wherein the advanced state resource is associated with a state resource of a plurality of state resources in a process management resource, and the advanced state resource is linked to at least one action resource of its associated state resource; receiving, by the common service entity, the request to create an advanced state resource, and creating the advanced state resource as a sub-resource of the process management resource according to the request to create an advanced state resource; and processing, by the common service entity, the process management resource, and setting a value of a current state attribute in the process management resource as an identifier of a state resource associated with the advanced state resource.

For example, at least one action resource of the state resource associated with the advanced state resource includes a target resource and a target operation, and the method further comprises: triggering a target operation for the target resource.

The embodiment of the disclosure also provides a method performed by an Internet of Things IoT terminal, comprising: displaying a plurality of states in a set IoT process and actions associated with the plurality of states; acquiring information for adjusting IoT process, wherein the information for adjusting IoT process instructs the IoT process to enter one of the plurality of states; and instructing the IoT device associated with the state to execute an action associated with the state based on the information for adjusting IoT progress.

For example, the displaying the plurality of states in the set IoT process and the actions associated with the plurality of states further comprise: displaying an IoT intelligent scene setting interface, wherein the IoT intelligent scene setting interface includes a plurality of set IoT processes; and in response to triggering a selection of one of the plurality of IoT processes, displaying a detailed setting page for further setting the selected IoT process and displaying a plurality of states in the IoT process and a plurality of actions associated with the plurality of states on the detailed setting page.

For example, the acquiring the information for adjusting IoT process further comprises: in response to triggering a selection of one of the plurality of states in the IoT process, acquiring the information for adjusting IoT process, wherein the information for adjusting IoT process instructs the IoT process to enter the selected state; or in response to triggering a selection of one of the plurality of actions in the IoT process, acquiring the information for adjusting IoT process, wherein the information for adjusting IoT process instructs the IoT process to process the selected action.

For example, the instructing the IoT device associated with the state to execute the action associated with the state further comprises: transmitting a request to create an advanced state resource to a service gateway of IoT, so as to instruct the IoT device associated with the state to execute the action associated with the state.

The embodiments of the present disclosure also provide an apparatus for process control performed by a common service entity, comprising: a receiving module for receiving a request to create an advanced state resource, wherein the advanced state resource is associated with a state resource of a plurality of state resources in a process management resource, and the advanced state resource is linked to at least one action resource of its associated state resource; a creating module for creating the advanced state resource as a sub-resource of the process management resource according to the request to create an advanced state resource; and an activating module for processing the process management resource, and setting a value of a current state attribute in the process management resource as an identifier of a state resource associated with the advanced state resource.

The embodiments of the present disclosure provide an apparatus for process control performed by an application entity, comprising: a transmitting module for transmitting a request to create an advanced state resource, wherein the advanced state resource is associated with a state resource of a plurality of state resources in a process management resource, and the advanced state resource is linked to at least one action resource of its associated state resource; a receiving module for receiving a response to create an advanced state resource, wherein the response to create an advanced state resource indicates that the advanced state resource is created as a sub-resource of the process management resource.

The embodiments of the present disclosure provide an IoT system for process control comprising an application entity and a common service entity, and the system is configured to: transmitting, by an application entity to a common service entity, a request to create a process management resource; receiving, by the common service entity, the request to create a process management resource, and creating the process management resource according to the request to create a process management resource; transmitting, by the application entity to the common service entity, a request to create a plurality of state resources; receiving, by the common service entity, the request to create a plurality of state resources, and creating the plurality of state resources as sub-resources of the process management resource according to the request to create a plurality of state resources; transmitting, by the application entity to the common service entity, a request to create at least one action resource, wherein the at least one action resource corresponds to one of the plurality of state resources; receiving, by the common service entity, the request to create at least one action resource, and linking the at least one action resource to its corresponding state resource according to the request to create at least one action resource; transmitting, by the application entity to the common service entity, a request to create an advanced state resource, wherein the advanced state resource is associated with a state resource of a plurality of state resources in a process management resource, and the advanced state resource is linked to at least one action resource of its associated state resource; receiving, by the common service entity, the request to create an advanced state resource, and creating the advanced state resource as a sub-resource of the process management resource according to the request to create an advanced state resource; and processing, by the common service entity, the process management resource, and setting a value of a current state attribute in the process management resource as an identifier of a state resource associated with the advanced state resource.

The embodiments of the present disclosure provide an electronic device. The electronic device comprises: one or more processors; and one or more memories, wherein the memories have computer-readable codes stored therein, and the computer-readable codes, when executed by the one or more processors, perform the above-mentioned methods.

According to yet another embodiment of the present disclosure, there is also provided a computer-readable storage medium having stored thereon instructions which, when executed by a processor, cause the processor to perform the above-mentioned method.

According to another aspect of the present disclosure, there is provided a computer program product or computer program comprising computer instructions stored in a computer-readable storage medium. A processor of a computer device reads the computer instructions from the computer-readable medium, and the processor executes the computer instructions, so that the computer device performs the methods provided in the above aspects or in various optional implementations of the above aspects.

By utilizing the embodiments of the present disclosure, it can be simulated that a condition for triggering an operation of an action resource has been met, so that the user can intuitively observe the effects of triggering an operation of a certain action resource, without influencing the realization of other state resources and process control in the process management resource at the same time. The embodiments of the present disclosure can enable the users to observe the operations of various IoT devices set by them immediately after completing the setting of an intelligent scene, and based on this, to determine whether to further adjust the intelligent scene, thus improving the setting efficiency for the intelligent scene. The embodiments of the present disclosure can also enable the users to set to enter the next state with a certain state skipped in the process after discovering a failure of the IoT device so that the intelligent scene would not be interrupted by device failure.

BRIEF DESCRIPTION OF DRAWINGS

In order to illustrate the technical solutions of the embodiments of the present disclosure more clearly, the accompanying drawings required in the description of the embodiments will be briefly introduced below. It is obvious for ordinary skilled in the art that, the accompanying drawings in the following description are merely some embodiments of the present disclosure, and other drawings may be obtained according to these accompanying drawings without making any creative efforts. The following accompanying drawings are not deliberately drawn to the same scale as the actual size, with emphasis on showing the gist of the present disclosure.

DETAILED DESCRIPTION

Figure 1A:
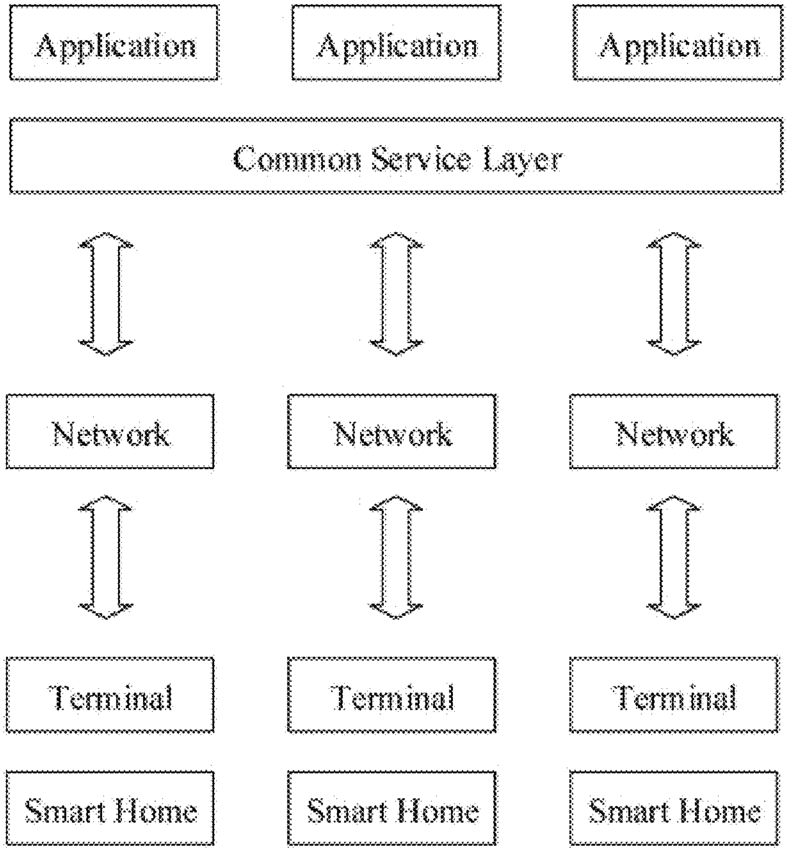
FIG. 1A shows a schematic diagram of an architecture for IoT according to an embodiment of the present disclosure.

In order to make the objects, technical solutions, and advantages of the present disclosure more obvious, the example embodiments according to the present disclosure will be described in detail below with reference to the accompanying drawings. Obviously, the described embodiments are merely part of the embodiments of the present disclosure, not all the embodiments of the present disclosure, and it should be understood that the present disclosure is not limited by the example embodiments described here.

In the present specification and accompanying drawing, substantially like or similar steps and elements are denoted by like or similar reference numerals, and repetitive descriptions of such steps and elements will be omitted. Meanwhile, in the description of the present disclosure, terms such as "first", "second" etc. are only used to distinguish descriptions, while cannot be understood as indicating or implying relative importance or ranking.

With the development of information technology, especially Internet technology, the IoT technology used to achieve an informative, remotely managed and controlled, and intelligent network is getting mature gradually. The IoT connects sensors, controllers, machines, persons, things, etc. together in a new way by utilizing communication technologies such as local networks or the Internet, forming interconnections between humans and things and between things. The IoT, which is an extension of the Internet, includes the Internet and all resources on the Internet and is compatible with all applications of the Internet. With the application of IoT technology in various fields, various new application fields have emerged, such as smart homes, intelligent transportation, intelligent health, and so on.

Figure 1B:
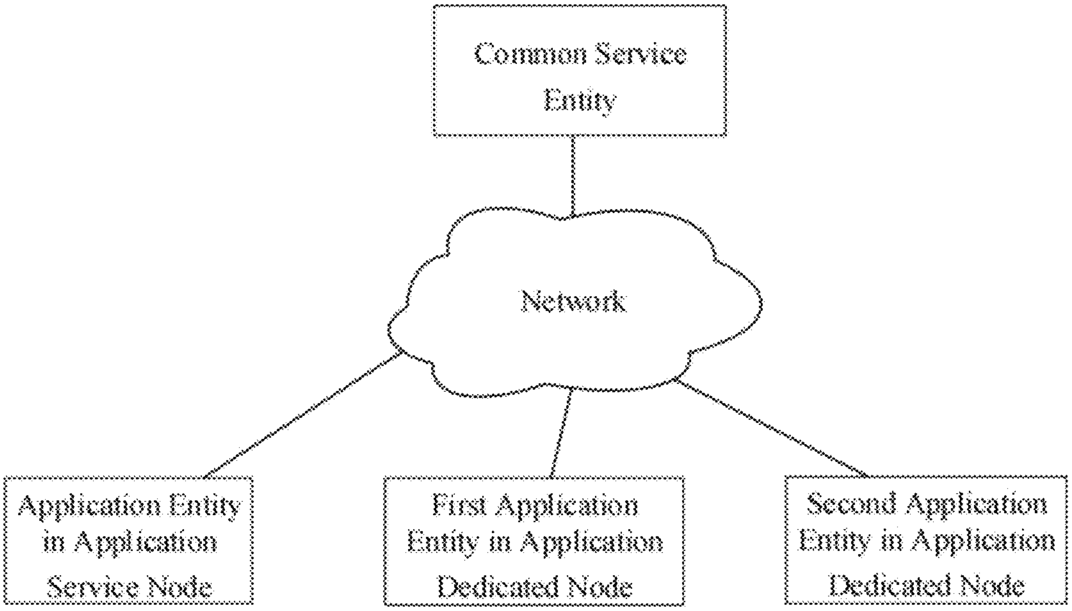
FIG. 1B shows a schematic diagram of connections between various devices according to an embodiment of the present disclosure.
Figure 1C:
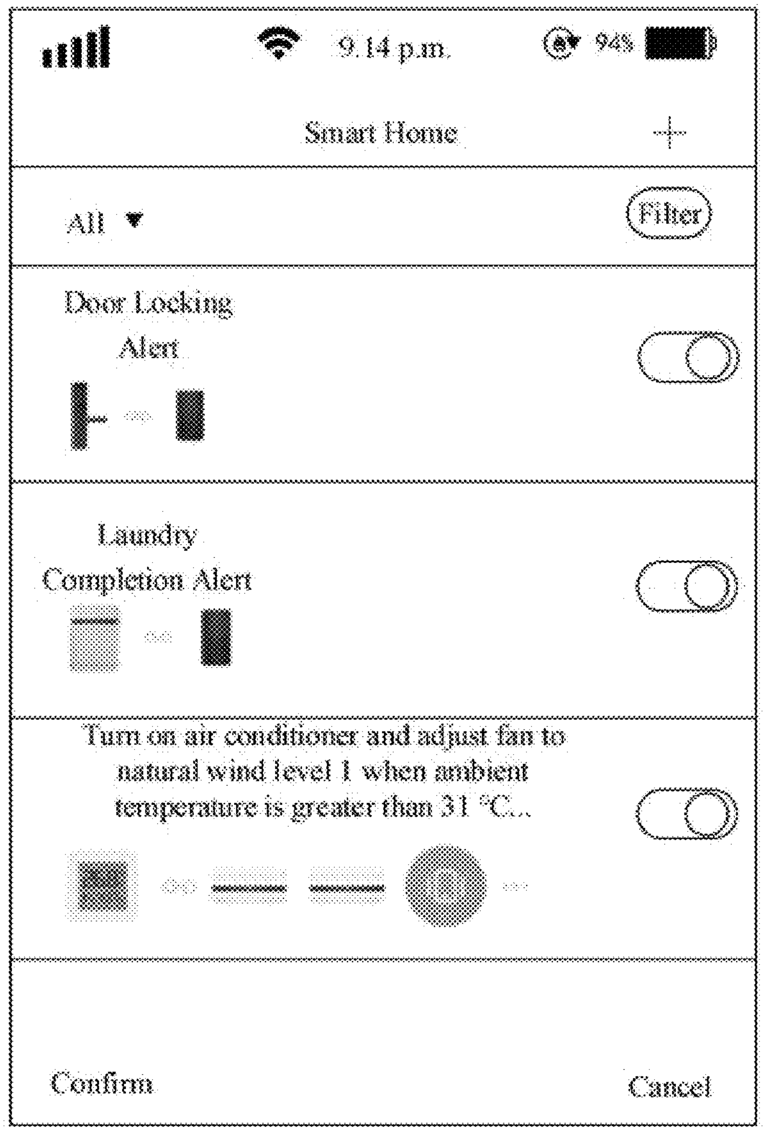
FIG. 1C shows a diagram of an interface for ASN-AE according to an embodiment of the present disclosure.
Figure 1D:
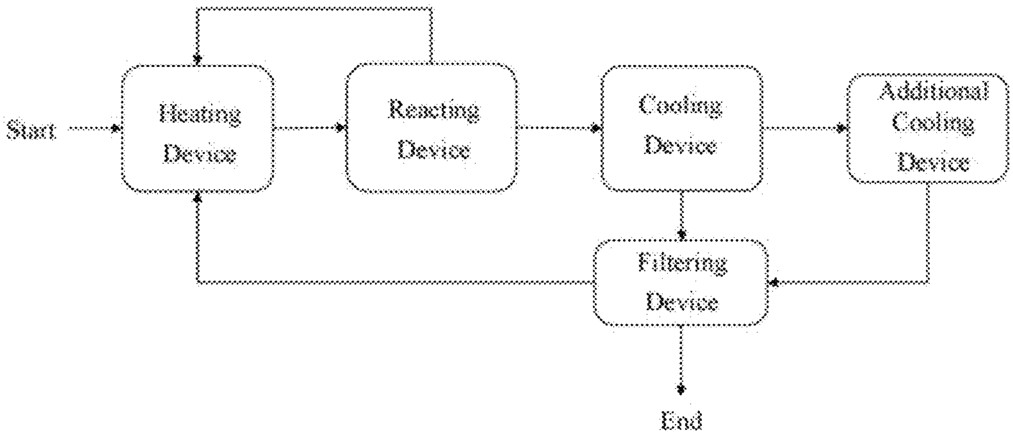
FIG. 1D shows a schematic diagram of an intelligent production scene according to an embodiment of the present disclosure.

FIG. 1A shows a schematic diagram of an architecture for IoT according to an embodiment of the present disclosure. FIG. 1B shows a schematic diagram of connections between various devices according to an embodiment of the present disclosure. FIG. 1C shows a diagram of an interface for ASN-AE according to an embodiment of the present disclosure. FIG. 1D shows a schematic diagram of an intelligent production scene according to an embodiment of the present disclosure.

As shown in FIG. 1A, client devices of various terminals access the network and access a common service layer through the network, while the common service layer supports various applications, thereby forming an architecture of terminal+network+application. For example, in the field of smart home, various household devices can access a common service platform utilizing local area network (LAN), and such an access to LAN may be conducted, e.g., in a wireless or wired way. Optionally, the local area network may be a personal area network (PAN), for example, as for a wireless personal area network (WPAN), various technologies such as Bluetooth, IrDA, Home RF, ZigBee, or UWB (Ultra-Wideband Radio) may be adopted to achieve access.

As previously mentioned, when an IoT entity (e.g., a software module in an IoT terminal device or a node device) transmits data or information to a common service entity, the data or information may be stored as a separate resource. In addition, the IoT entity can transmit a request to the common service entity, so as to update the resources corresponding to the IoT entity stored on the common service entity, in order to reflect the states of devices operated by the IoT entity. Such updates may be real-time, periodic, or triggered by a certain condition. As such, other IoT entities communicating with the common service entity can learn the states of devices corresponding to the IoT entity by accessing the updated resources; alternatively, other IoT entities communicating with the common service entity can operate on the updated resources. It should be noted that the resources mentioned here include resources of various entities (e.g., which may be embodied, in an IoT device, as a software module, such as AE, CSE, and other entities). An entity may represent a software module of a communication device, whereas a common service entity may represent a software module of a service platform, which may be either local or remote. Optionally, operating on the updated resources comprises, for example, acquiring information on the updated resources, deleting the information on the updated resources, notifying a third party of the information on the updated resources, or operating on other resources based on the information of the updated resources.

In the present disclosure, the described entities, such as application entities AEs, common service entities CSEs, data, etc., may all be represented in terms of resources. Specifically, a resource may include attributes and sub-resources, wherein the attributes are used to store information related to the resource (e.g., an identifier of resource, physical location of AE corresponding to resource, state information of resource, etc.), the sub-resources are resources at the next level for the resource, and the resource includes an index pointing to a resource at the next level.

An application entity AE may include an application entity in an application service node ASN-AE and an application entity in an application dedicated node AND-AE. The application entity ASN-AE may be television, smart home appliances (e.g., smart refrigerator, smart microwave oven, etc.), rechargeable car, desktop computer, notebook computer, smart phone, tablet computer, music player (e.g., mp3 player, etc.) and other terminals including processors and memories (e.g., mobile terminal, smart terminal). The application entity ASN-AE may have IoT-related applications installed thereon, to set operations of the application entity AND-AE through the common service entity CSE.

Referring to FIG. 1B, the common service entity CSE, the application entity in the application service node ASN-AE (e.g., a mobile phone terminal), a first application entity in the application-specific node and a second application entity in the application-specific node may be connected through the network. The above devices can communicate with each other directly or indirectly, for example, by transmitting and receiving data and/or signals to/from each other over the network.

The network may be an Internet-based IoT and/or telecommunication-network-based IoT, which may be either wired or wireless. For example, it may be an electronic network that is capable of information exchanging functions of networks, such as local area network (LAN), metropolitan area network (MAN), wide area network (WAN) and cellular data communication network.

In some embodiments, the application entity AND-AE may be a small IoT device such as a thermometer, air conditioner, fan, lamp, etc. After such AND-AEs are registered with the CSE, the CSE can create corresponding resources on itself. The CSE controls such AND-AEs by operations on corresponding resources.

In some embodiments, the operator operates in the ASN-AE (e.g., edits intelligent scene) and sends a request to the CSE to create an intelligent scene (e.g., a request to create a process management resource, a request to create an action resource, a request to create a state resource, etc.), so that various AND-AEs can be interconnected.

For example, in a smart home scene involved in FIG. 1C, various IoT devices can be interconnected. The ASN-AE can set an intelligent scene as shown in FIG. 1C to control IoT devices, including temperature sensors, air conditioning devices, and fan devices. For example, such a smart home scene may be set so that: when the temperature sensor detects that the ambient temperature is greater than 31° C., the air conditioner is turned on, the fan is adjusted to natural wind level 1, the head-swing action is enabled, and a scene trigger notification is transmitted to the terminal device (such as mobile phone APP). One hour later, the temperature sensor performs detection again, and when the temperature sensor detects that the ambient temperature is less than 29° C., the air conditioner is turned off and the fan is adjusted to natural wind level 4.

However, in such a scene, based on the current process control method for IoT, the user cannot observe the effects of turning on of air conditioner or the adjustment of fan immediately after completing the setting. Instead, the user must wait until the temperature sensor detects that the temperature is greater than 31° C. before automatically executing the intelligent scene. Therefore, the user cannot verify whether the turning on of the air conditioner and the adjustment of the fan are successfully set, or whether such setting is appropriate, immediately after completing the setting. Therefore, it is necessary to improve the current process control method for IoT, so that after the user completes the setting, it can be simulated that a condition that the current ambient temperature is greater than 31° C. has been met even if the current ambient temperature is still less than 31° C., and then the air conditioner and the fan are turned on and observed for their operation.

For another example, in an intelligent production scene involved in FIG. 1D, there can be interconnections among various IoT production devices. It is assumed that the IoT production devices include: a heating device, a reacting device, a cooling device, an additional cooling device and a filtering device. Such an intelligent production scene may be set so that:

① the heating device is turned on to heat the solution to be produced and a timer is started, and if the PH value is less than 3, cooling water is added;

② if it is detected that the temperature of the solution to be produced is greater than 70° C., the solution to be produced is transferred to the reacting device, and at the same time, the heating device is turned off and the agitator in the reacting device is turned on. The timer is restarted. If the detected PH value is less than 3, hot water is added;

③ if it is detected that the temperature of the solution is less than 60° C., the solution is returned to the heating device for reheating, and the timer is restarted;

④ when the timer indicates that the time duration of the reaction has reached 2 hours, the solution for which the reaction has completed is transferred to the cooling device, the agitator in the reacting device is turned off, the timer is restarted, and the first cooling device is turned on;

⑤ when the timer indicates that the time duration of the reaction has reached 1 hour, the temperature of the solution is detected, and if the temperature of the solution is still greater than 60° C., the solution is transferred to the additional cooling device and the second cooling device is turned on. If the temperature of the solution is less than 60° C., the solution is transferred to the filtering device, and the filter is turned on;

⑥ if it is detected that the quality of the filtered solution reaches the quality standard, the solution is bottled. If it is detected that the quality of the filtered solution has not reached the quality standard, the solution is transferred to the heating device.

However, in such a scenario, based on the current process control method for IoT, if there is a device failure in the timer during step ④, all the solutions must be redirected to the heating device for reheating. This would result in a situation where the solution, for which the condition for transfer to the cooling device has been met, is unnecessarily reheated and reacted upon, leading to a waste of production time. Additionally, if the duration of the failure is prolonged, the reaction time may exceed the acceptable limit, causing the pH value of the solution to drop too low and leading to a failed reaction, thus wasting precious raw materials. Therefore, it is needed to enhance the existing process control method for IoT. Thus, after the production line manager has finished configuring the production device, it should be possible to simulate if the current reaction time has reached 2 hours, even in the event of a device failure in the timer. Consequently, the solution can be transferred to the cooling device to ensure uninterrupted production of the solution.

To this regard, the embodiments of the present disclosure provide a process control method in an IoT to improve the current process control method for IoT.

Figure 2A:
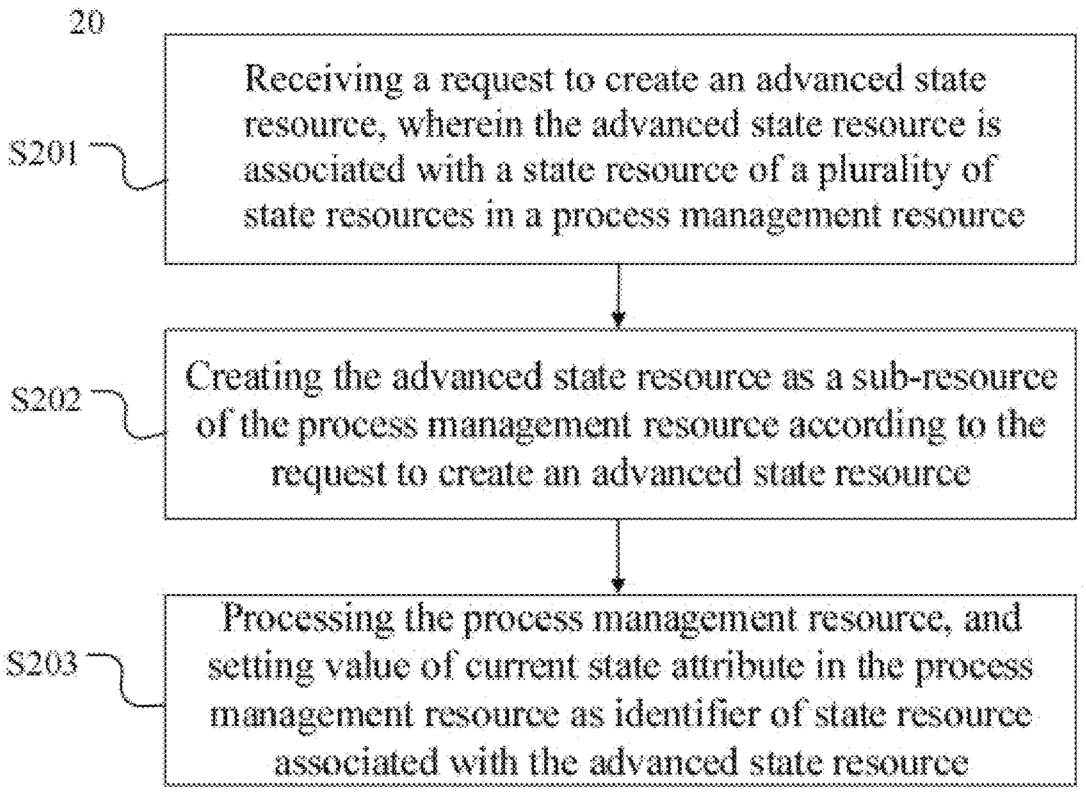
FIG. 2A shows a flowchart for a process control method performed by a common service entity according to an embodiment of the present disclosure.
Figure 2B:
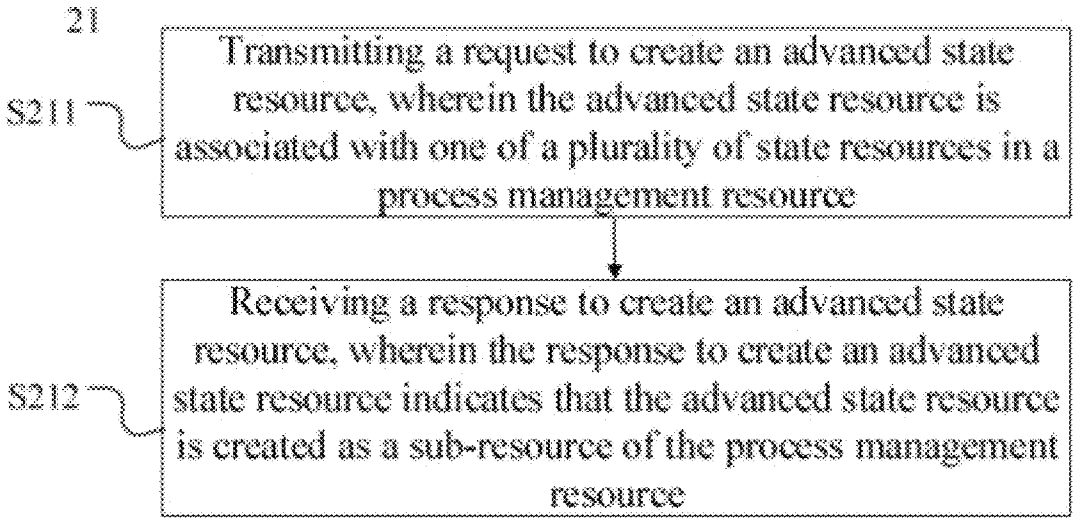
FIG. 2B shows a flowchart for a process control method performed by an application entity according to an embodiment of the present disclosure.
Figure 2C:
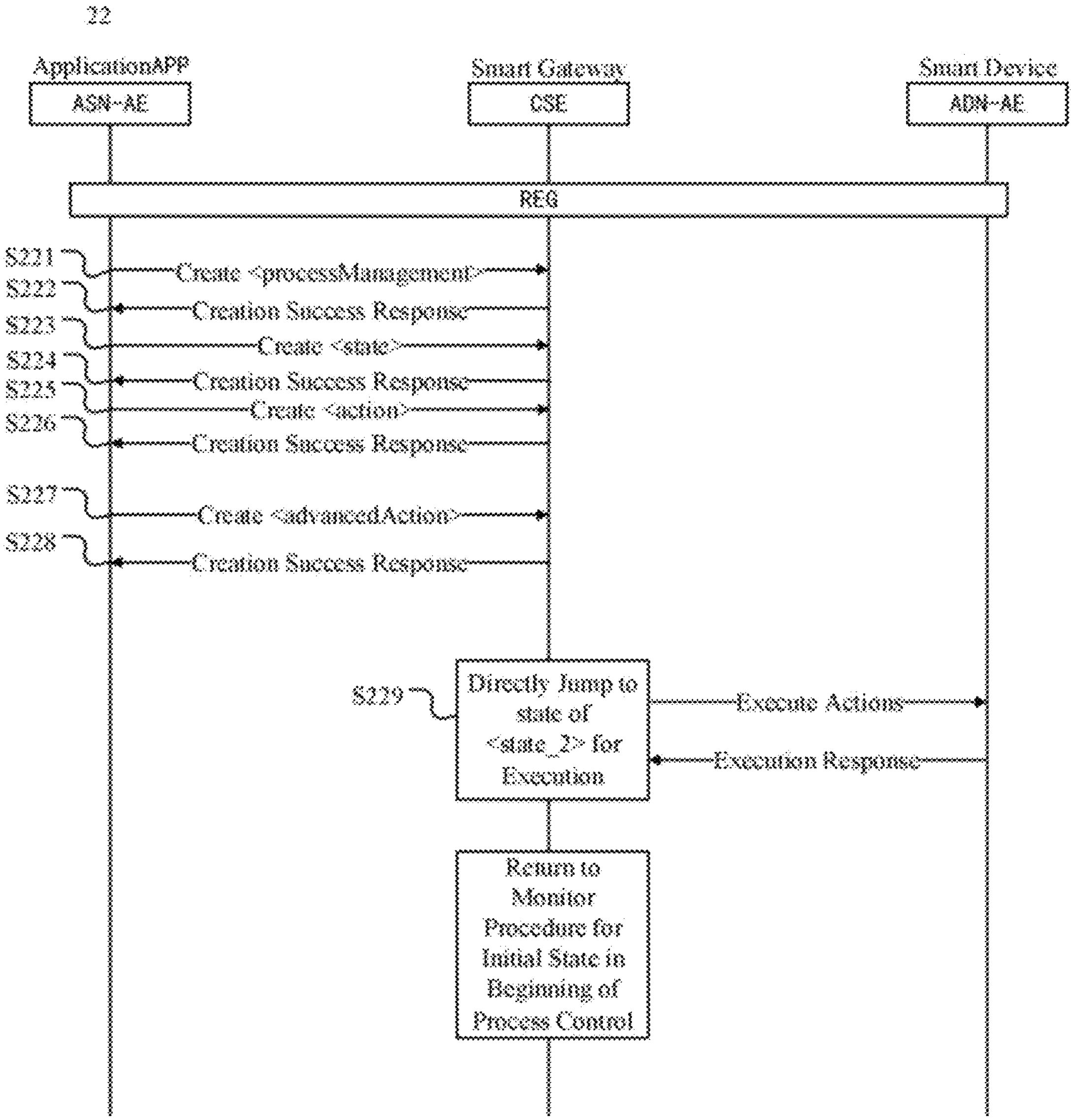
FIG. 2C shows a diagram of an interaction between a common service entity and an application entity according to an embodiment of the present disclosure.

FIG. 2A shows a flowchart for a process control method 20 performed by a common service entity according to an embodiment of the present disclosure. FIG. 2B shows a flowchart for a process control method 21 performed by an application entity according to an embodiment of the present disclosure. FIG. 2C shows a diagram of an interaction between a common service entity and an application entity according to an embodiment of the present disclosure.

Referring to FIG. 2A, the process control method 20 performed by the common service entity (e.g., CSE) according to an embodiment of the present disclosure comprises steps S201 to S203.

In step S201, a request to create an advanced state resource is received, wherein the advanced state resource is associated with a state resource of a plurality of state resources in a process management resource.

In step S202, the advanced state resource is created as a sub-resource of the process management resource according to the request to create an advanced state resource.

In step S203, the process management resource is processed, and a value of a current state attribute in the process management resource is set as an identifier of a state resource associated with the advanced state resource.

Optionally, in a case that the request to create an advanced state resource includes an advanced control attribute corresponding to the advanced state resource, in step S203, the setting the value of the current state attribute in the process management resource as the identifier of the state resource associated with the advanced state resource further comprises: setting the value of the current state attribute in the process management resource as a value corresponding to the advanced state resource in a case that the advanced control attribute indicates that the advanced state resource is enabled (e.g., the value of the advanced control attribute <advancedControl> is “enable”); and setting the value of the current state attribute in the process management resource as a value of an initial state attribute in the process management resource in a case that the advanced control attribute indicates that the advanced state resource is disabled (e.g., the value of the advanced control attribute <advancedControl> is “disabled” or “NULL”).

Optionally, before executing step S201, the common service entity may also: receive a request to create a process management resource, and create the process management resource according to the request to create a process management resource; receive a request to create a plurality of state resources, and create the plurality of state resources as sub-resources of the process management resource according to the request to create a plurality of state resources; receive a request to create at least one action resource, wherein the at least one action resource corresponds to one of the plurality of state resources; and link the at least one action resource to its corresponding state resource according to the request to create at least one action resource.

Optionally, at least one action resource of the state resource associated with the advanced state resource includes a target resource and a target operation, and the method further comprises: triggering a target operation for the target resource.

Referring to FIG. 2B, the process control method 21 performed by the application entity (e.g., ASN-AE) according to an embodiment of the present disclosure comprises steps S211 to S212.

In step S211, a request to create an advanced state resource is transmitted, wherein the advanced state resource is associated with a state resource of a plurality of state resources in a process management resource.

Wherein, the request to create an advanced state resource may further include an advanced control attribute (e.g., <advancedControl>) corresponding to the advanced state resource, and the advanced control attribute indicates that the advanced state resource is enabled or disabled.

In step S212, a response to create an advanced state resource is received, wherein the response to create an advanced state resource indicates that the advanced state resource is created as a sub-resource of the process management resource.

Optionally, before transmitting the request to create an advanced state resource, the application entity may also: transmit a request to create a process management resource; transmit a request to create a plurality of state resources, wherein the request to create a plurality of state resources indicates that the plurality of state resources are created as sub-resources of the process management resource; and transmit a request to create at least one action resource, wherein the at least one action resource corresponds to one of the plurality of state resources.

By utilizing methods 20 and 21, the common service entity can receive a request from the application entity to create an advanced state resource. After analyzing the request, the common service entity can then decide to proactively process a specific action resource that is associated with the corresponding state resource. This approach enhances the efficiency of process management for IoT.

Referring to FIG. 2C, in combination with methods 20 and 21 described above, the process control method 22 for IoT according to an embodiment of the present disclosure comprises the following steps.

In step S221, a request to create a process management resource is transmitted by an application entity (e.g., ASN-AE, application APP in FIG. 2C) to a common service entity (e.g., CSE).

In step S222, the request to create a process management resource is received by the common service entity, and the process management resource (e.g., <processManagement>) is created according to the request to create a process management resource. Optionally, the common service entity transmits a creation success response to the application entity after successfully creating the process management resource.

In step S223, a request to create a plurality of state resources is transmitted by the application entity (e.g., ASN-AE, application APP in FIG. 2C) to the common service entity.

In step S224, the request to create a plurality of state resources is received by the common service entity, and the plurality of state resources (e.g., <state>) are created as sub-resources of the process management resource according to the request to create a plurality of state resources. Optionally, the common service entity transmits a creation success response to the application entity after successfully creating the state resource.

In step S225, a request to create at least one action resource is transmitted by the application entity to the common service entity, wherein the at least one action resource corresponds to one of the plurality of state resources.

In step S226, the request to create at least one action resource is received by the common service entity, and the at least one action resource (e.g., <action>) is linked to its corresponding state resource according to the request to create at least one action resource. Optionally, the common service entity transmits a creation success response to the application entity after successfully creating the action resource.

In step S227, a request to create an advanced state resource is transmitted by the application entity to the common service entity, wherein the advanced state resource is associated with a state resource of a plurality of state resources in a process management resource, and the advanced state resource is linked to at least one action resource of its associated state resource. Wherein, the request to create an advanced state resource further includes an advanced control attribute corresponding to the advanced state resource, and the advanced control attribute indicates that the advanced state resource is enabled or disabled. Step S227 is similar to step S211 in method 21, and will not be detailed here.

In step S228, the request to create an advanced state resource is received by the common service entity, and the advanced state resource is created as a sub-resource of the process management resource according to the request to create an advanced state resource. Step S228 is similar to steps S201 and S202 in method 20, and will not be detailed here. Optionally, the common service entity transmits a creation success response to the application entity after successfully creating the advanced state resource.

In step S229, the process management resource is processed by the common service entity, and a value of a current state attribute in the process management resource is set as an identifier of a state resource associated with the advanced state resource.

Wherein, in a case that the request to create an advanced state resource further includes an advanced control attribute corresponding to the advanced state resource, the setting the value of the current state attribute in the process management resource as the identifier of the state resource associated with the advanced state resource further comprises: setting the value of the current state attribute in the process management resource as a value corresponding to the advanced state resource in a case that the advanced control attribute indicates that the advanced state resource is enabled; and setting the value of the current state attribute in the process management resource as a value of an initial state attribute in the process management resource in a case that the advanced control attribute indicates that the advanced state resource is disabled.

Wherein, at least one action resource of the state resource associated with the advanced state resource includes a target resource and a target operation, and the method further comprises: triggering a target operation for the target resource. For example, as shown in FIG. 2C, when the state resource associated with the advanced state resource is state_2, the CSE processes the action resource associated with state_2. It is assumed that the target resource corresponding to the action resource is the AND-AE (e.g., smart device) as shown in FIG. 2C, the AND-AE executes the corresponding target action.

After completing the processing of the entire process, the CSE will re-monitor the initial state in the process management resources and restart the entire process from the initial state.

For example, in the smart home scene involved in FIG. 1C, the user has made the following settings: when the temperature sensor detects that the ambient temperature exceeds 31° C., the air conditioner is turned on, the fan is set to the natural wind level 1, the head-swing function is enabled, and a notification to trigger the scene is sent to the terminal device (such as a mobile phone app). After one hour, the temperature sensor performs another detection. If the sensor detects that the ambient temperature is below 29° C., the air conditioner is turned off and the fan is adjusted to the natural wind level 4.

At this time, in order to observe more directly whether the intelligent scene is successfully set, the user can transmit a request to the CSE to create an advanced state resource through the ASN-AE after completing the setting, wherein the request instructs to simulate that the condition that the current ambient temperature is greater than 31° C. has been met, and request the CSE to try to perform associated operations in subsequent state resources and action resources. If the CSE turns on the air conditioner, adjusts the fan to natural wind level 1, and enables the head-swing action, then the user can be sure that the current intelligent scene is set successfully. If the CSE fails to turn on the air conditioner successfully, it means that the intelligent scene setting is wrong or failed.

For another example, in the intelligent production scene involved in FIG. 1D, the production line manager has done the setting for an intelligent production scene, in which: ① the heating device is turned on to heat the solution to be produced and a timer is started, and if the PH value is less than 3, cooling water is added; ② if it is detected that the temperature of the solution to be produced is greater than 70° C., the solution to be produced is transferred to the reacting device, and at the same time, the heating device is turned off and the agitator in the reacting device is turned on. The timer is restarted. If the detected PH value is less than 3, hot water is added; ③ if it is detected that the temperature of the solution is less than 60° C., the solution is returned to the heating device for reheating, and the timer is restarted; ④ when the timer indicates that the time duration of the reaction has reached 2 hours, the solution for which the reaction has completed is transferred to the cooling device, the agitator in the reacting device is turned off, the timer is restarted, and the first cooling device is turned on; ⑤ when the timer indicates that the time duration of the reaction has reached 1 hour, the temperature of the solution is detected, and if the temperature of the solution is still greater than 60° C., the solution is transferred to the additional cooling device and the second cooling device is turned on. If the temperature of the solution is less than 60° C., the solution is transferred to the filtering device, and the filter is turned on; ⑥ if it is detected that the quality of the filtered solution reaches the quality standard, the solution is bottled. If it is detected that the quality of the filtered solution has not reached the quality standard, the solution is transferred to the heating device.

At this time, if a device failure occurs in the timer in step ④, and the solution has met the condition for transferring to the cooling device, the production line manager may transmit a request to the CSE to create an advanced state resource through the ASN-AE, wherein the request instruct to simulate that the condition that the current time duration of the reaction has reached 2 hours has been met, and then to transfer the solution to the cooling device, so that the production of the solution can continue.

Therefore, by utilizing methods 20 and 21 as described in the embodiments of this disclosure, it becomes possible to simulate the fulfillment of a condition that triggers the operation of an action resource. This allows the user to visually observe the effects of triggering the operation of an action resource, without compromising the realization of other state resources and process control within the process management resource. The embodiments of this disclosure enable users to immediately observe the operations of various IoT devices that they have set up after completing the configuration of an intelligent scene. Based on this observation, users can determine whether further adjustments to the intelligent scene are necessary, thereby enhancing the efficiency of scene configuration and overall work efficiency. Furthermore, the embodiments of this disclosure also empower users to skip a certain state in the process and proceed to the next state in the event of an IoT device failure. This ensures that the intelligent scene remains uninterrupted despite any device malfunctions.

Figure 3A:
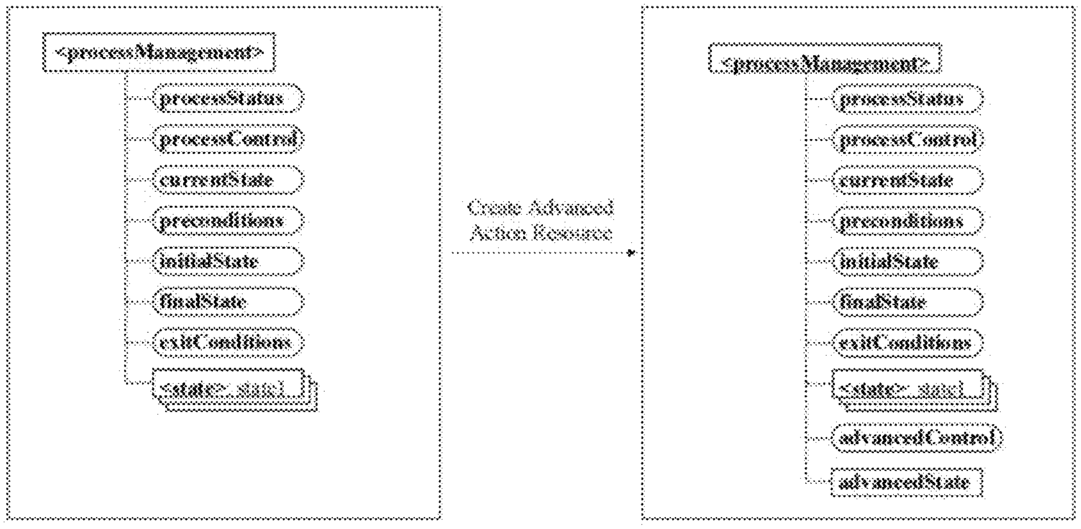
FIG. 3A shows a schematic diagram of changes in process management resources before and after the creation of an advanced state resource by a common service entity according to an embodiment of the present disclosure.
Figure 3B:
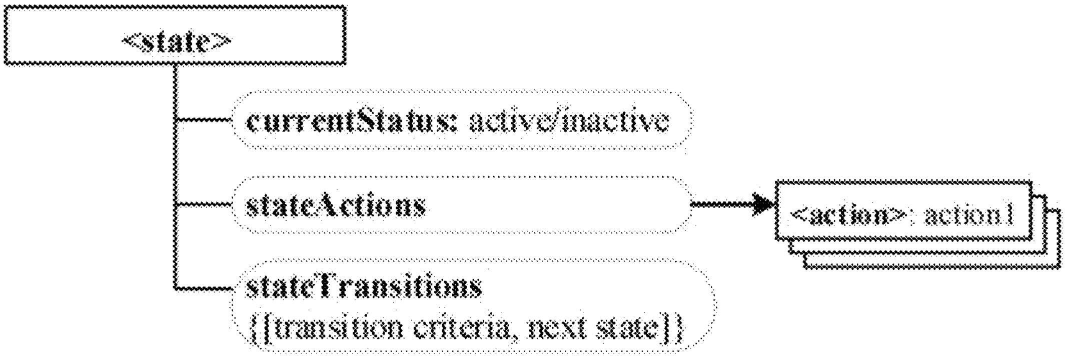
FIG. 3B shows a schematic diagram of a state resource according to an embodiment of the present disclosure.
Figure 3C:
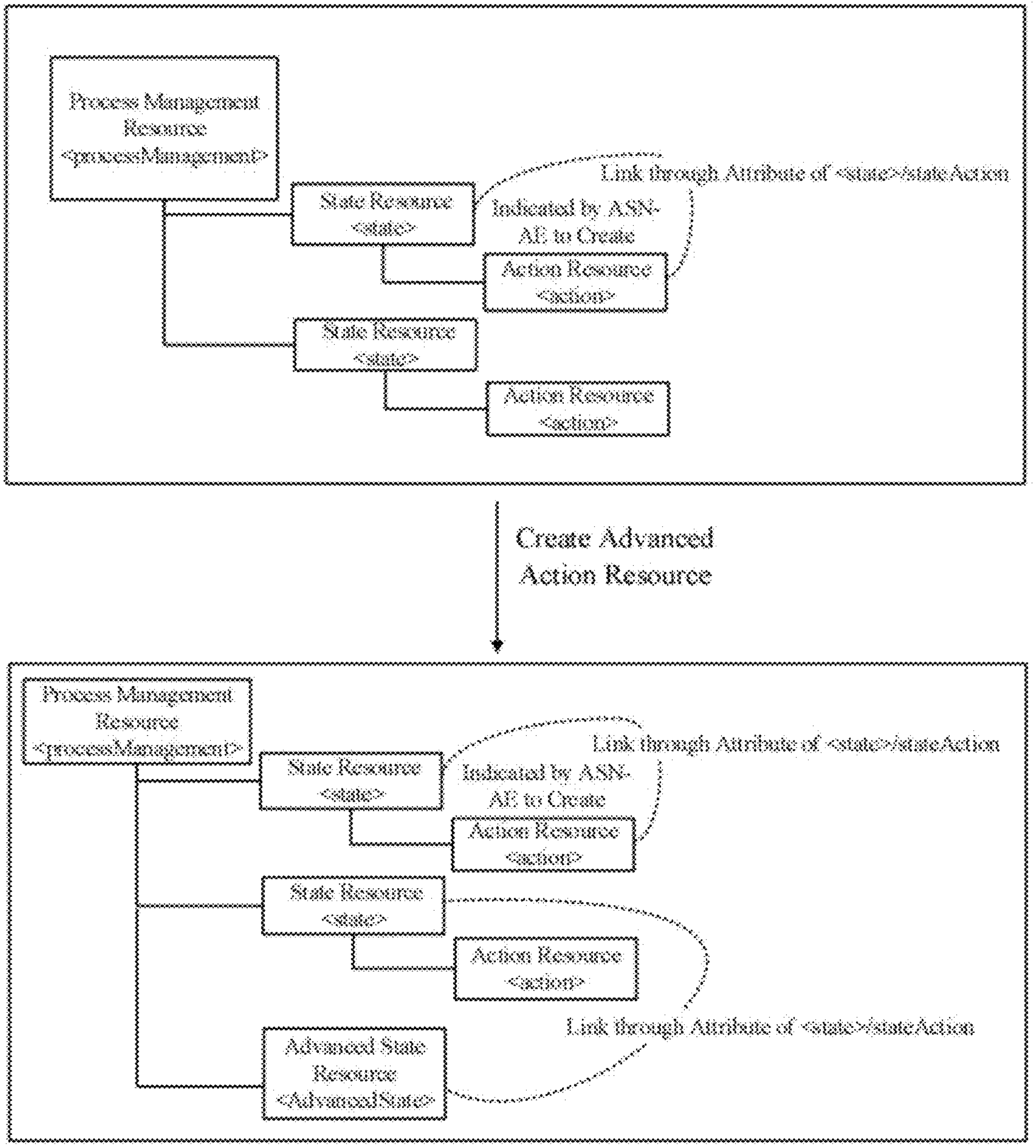
FIG. 3C shows another schematic diagram of changes in process management resources before and after the creation of an advanced state resource by a common service entity according to the embodiments of the present disclosure.
Figure 3D:
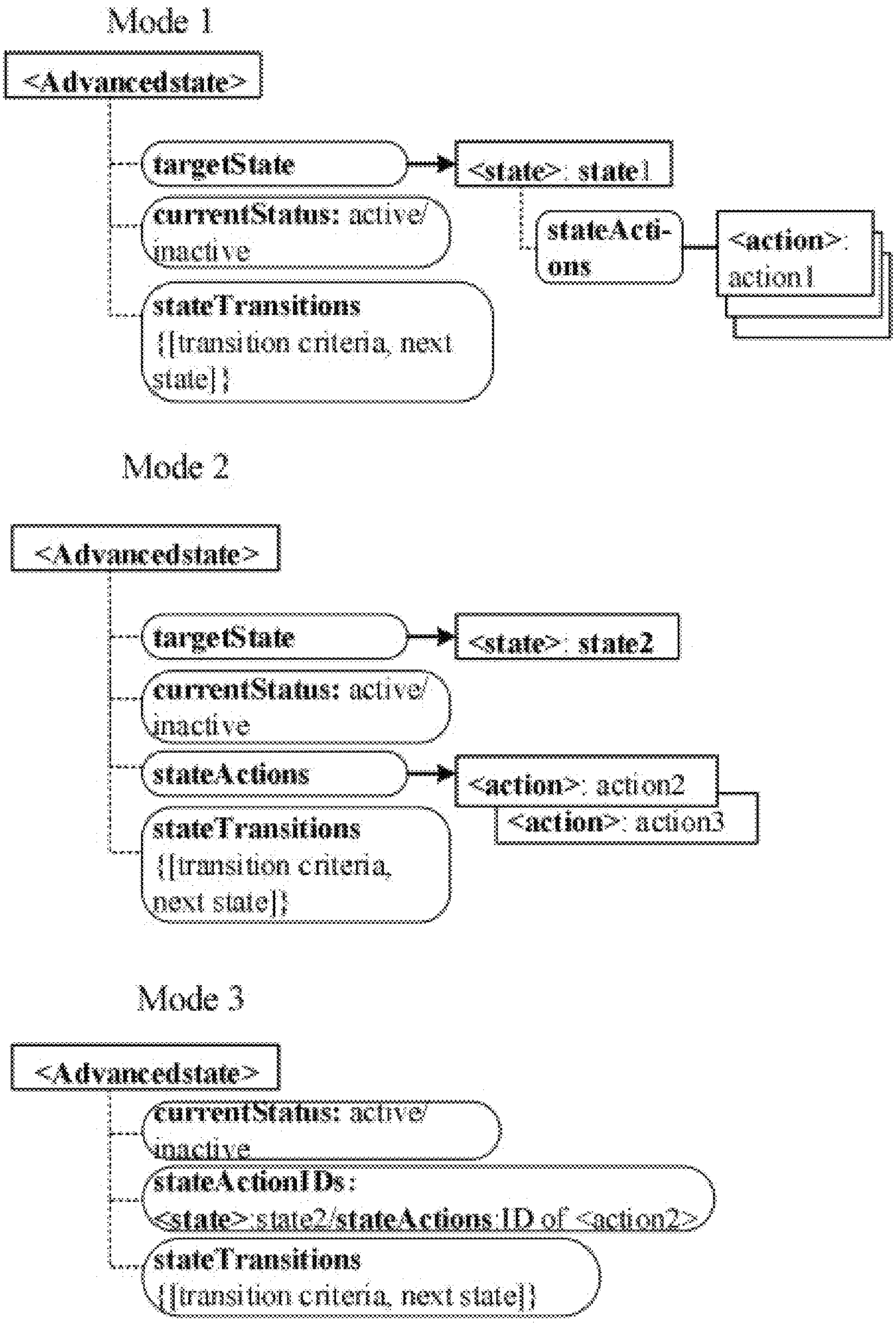
FIG. 3D shows a schematic diagram of an advanced state resource according to an embodiment of the present disclosure.

FIG. 3A shows a schematic diagram of changes in process management resources before and after a creation of an advanced state resource by a common service entity according to an embodiment of the present disclosure. FIG. 3B shows a schematic diagram of a state resource according to an embodiment of the present disclosure. FIG. 3C shows another schematic diagram of changes in process management resources before and after a creation of an advanced state resource by a common service entity according to the embodiments of the present disclosure. FIG. 3D shows a schematic diagram of an advanced state resource according to an embodiment of the present disclosure.

Referring to FIG. 3A, before creating the advanced state resource, the process management resource residing in the CSE may include a plurality of sub-resources and a plurality of attributes.

For example, as shown in FIG. 3A, a process management resource may include various attributes shown in Table 1. It should be understood by those skilled in the art that Table 1 is merely an example, and a process management resources may also include more or less attributes.

TABLE 1

Attributes of Process Management Resource

| Attributes of <processManagement> | Description |
|---|---|
| Resource Identifier (resourceID) | This attribute indicates the identifier of the process management resource. |
| Process Status (processStatus) | This attribute describes the status of the current process, and its allowed values include:<br>"Disabled": indicating that this process is disabled.<br>"Enabled": indicating that this process is enabled.<br>"Activated": indicating that the CSE has activated this process. Once this process is activated, the CSE will monitor and execute corresponding actions in action resources based on state resources.<br>"Paused": indicating that the CSE has paused this process.<br>"Completed": indicating that this process has been completed.<br>"Aborted": indicating that this process was aborted due to an exception. |
| Process Control (processControl) | This attribute instructs the CSE to enable, disable and pause processing process. The values supported for this attribute are: "Enabled", "Disabled", "Paused" and "Activated". |
| Current State (currentState) | This attribute indicates the resource identifier of the <state> sub-resource with stateStatus set to "active". If processStatus is not "Activated" or "Paused", the value of this attribute should be NULL. |
| Activate Conditions (activateConditions) | This attribute specifies the conditions that should be met when the CSE starts processing. When the specified activateConditions are met or no activateConditions are specified, the CSE should update processStatus to "Activated", update currentState to the value defined in initialState, and start processing this process. The CSE should also change the attribute stateStatus of the <state> resource indicated by the initial state to "active". |
| End Conditions (endConditions) | This attribute specifies the early exit criteria that the CSE should monitor to detect whether/when to stop processing the defined states of process.<br>This attribute allows the process to exit asynchronously from any state. When an exit condition is detected, the CSE should set the attribute processStatus to "Completed" and set the states of all <state> sub-resources to "inactive".<br>If endConditions is not specified, the hosted CSE should end the process after having processed the last <state> resource of the process or aborting the process due to an error. |
| Initial state (initialState) | The resource identifier of the first <state> resource in the process |

For example, a process management resource in a CSE may be defined with <processManagement> as a label (or a tag). In addition to <processManagement> resource, other potential resources related to process include: <state> sub-resources of <processManagement> resource, <action> sub-resources of <state> resources referenced by attribute stateAction of each <state> resource, resources referenced by attribute stateTransitions of each <state> resource, resources referenced by attributes actionSubjectResources, objectResourceTD, subjectResourceID, and evalCriteria of each related <action> resource, <accessControlPolicy> resource referenced by <accessManagement> resource and all other related resources, and so on. This disclosure is not limited thereto.

Optionally, the request to create an advanced state resource may further include an advanced control attribute <advancedControl> corresponding to the advanced state resource. The value of the advanced control attribute <advancedControl> is "enable", "disable" or "NULL". The value of this attribute indicates whether the advanced state resource is enabled, that is, whether to enable the advancing of a certain state.

For example, a process management resource include a plurality of state resources as sub-resources. For example, as shown in FIG. 3B, a state resource may include various attributes shown in Table 2. It should be understood by those skilled in the art that Table 2 is merely an example, and a state resource may also include more or less attributes.

TABLE 2

| Attributes of State Resource | |
|---|---|
| Attributes of <state> | Description |
| Resource identifier (resourceID) | This attribute indicates the identifier of the state resource. |
| State Status (stateStatus) | This attribute indicates whether this state is currently the active state in the process. The values supported for this attribute include "active" and "inactive". |
| State Action (stateAction) | This attribute indicates the resource identifier of the <action> sub-resource executed by the CSE when the state is the active state in the process. |
| State Transitions (stateTransitions) | This attribute indicates a list of criteria used by the CSE to determine whether/when to transition from this state to another state. Each entry in this list is defined as a tuple consisting of the following two elements. evalCriteria: identifying the condition for state transition. next state: the resource identifier of the next <state> resource. If this <state> resource represents the last state in the process, this attribute should be NULL. |

When the common service entity manages an "Enabled" or "Activated" process and encounters an error condition (e.g., that the <state> or <action> resource cannot be accessed), the common service entity should update the attribute stateStatus of the current <state> resource to "inactive", and update the attribute processStatus of the <processManagement> resource to "Aborted", thus aborting the process.

For example, the association relationship between the process management resource, the state resource and the action resource that have been created on the common service entity before creating the advanced state resource can be shown in FIG. 3C.

Referring to FIG. 3C, a common service entity utilizes a <processManagement> resource to define and manage a process. Then, a state resource (<state> resource) corresponding to a state in the process is created as a sub-resource of the <processManagement> resource. The <action> resources corresponding to operations performed by the common service entity on each state are also created as sub-resources of each <state> resource, and are linked through the attribute stateAction. The evalCriteria defined by the <action> sub-resources of each <state> resource will not be monitored by the common service entity until the process is activated and has transitioned to a state defined by each <state> resource. If evalCriteria is not defined for the <action> sub-resources of the <state> resource, then when the process is activated and has transitioned to a state defined by the <state> resource, the common service entity should execute a corresponding action.

The application entity ASN-AE can further configure the attributes activateConditions and endConditions. That is, the user can define the criteria used by the common service entity to trigger the activation and termination of the process. Once the process is enabled by the application entity ASN-AE (e.g., the user enbles the intelligent scene), the user-defined criteria (e.g., when the temperature sensor detects that the ambient temperature is greater than 31° C., the air conditioner is turned on) will be monitored by the common service entity.

The application entity ASN-AE can further configure the first state in the process through the attribute initialState of the <processManagement> resource. The application entity ASN-AE can update the attribute processControl of the <processManagement> resource to instruct the common service entity to enable, disable or pause the process.

Optionally, in the case that the request to create an advanced state resource includes an advanced control attribute <advancedControl> corresponding to the advanced state resource, referring to FIG. 3A, in the above step S203, the setting the value of the current state attribute in the process management resource as the identifier of the state resource associated with the advanced state resource further comprises: setting the value of the current state attribute in the process management resource as a value corresponding to the advanced state resource in a case that the advanced control attribute indicates that the advanced state resource is enabled (e.g., the value of the advanced control attribute <advancedControl> is "enable"); and setting the value of the current state attribute in the process management resource as a value of an initial state attribute in the process management resource in a case that the advanced control attribute indicates that the advanced state resource is disabled (e.g., the value of the advanced control attribute <advancedControl> is "disable" or NULL).

When managing a process, the common service entity should monitor the standard attributes (such as activateConditions, endConditions and stateTransitions) defined in the <processManagement> resources and <state> resources of the process to determine whether/when to execute the corresponding actions defined by the <action> resources of the process. When managing a process, the common service entity should update the state attributes (such as stateStatus, processStatus, currentState) defined in the <processManagement> resources and <state> resources of the process.

When entering a state, the common service entity can update the attribute currentState of the <processManagement> resource to the resource identifier of the <state> resource being processed, update the value of the attribute stateStatus of this <state> resource to "active", and check the <action> resource defined in the attribute stateAction. Optionally, for an unconditional action with evalCriteria as NULL, the common service entity should immediately execute an action at the beginning of the processing of <state>. Otherwise, the common service entity should monitor the attribute evalCriteria of the <action> resource to determine whether/when to execute the action. The common service entity should also monitor the parameter evalCriteria defined in the attribute stateTransitions of the <state> resource. If any criteria defined in the stateTransitions are met, the common service entity can perform a state transition.

When performing a state transition, the common service entity can update the attribute stateStatus of the current <state> resource to "inactive", and update the attribute stateStatus of the next <state> resource (if any) to "active". If the next <state> resource is not applicable (e.g., the common service entity has finished processing the last state in the process), the common service entity should update the attribute processStatus of the <processManagement> resource to a value of "Completed", thus ending the process.

When the common service entity manages a process, the common service entity can also monitor the criteria defined in the attribute endConditions of the <processManagement> resource. If any criterion defined in endConditions is met, the common service entity will end the process by updating the values of the attribute stateStatus of the current <state> resource and the attribute processStatus of the <processManagement> resource as "inactive" and "Completed", respectively.

When the common service entity manages a process, if it encounters an error condition (e.g., the common service entity cannot access the <state> or <action> resources), the common service entity should update the attribute stateStatus of the current <state> resource to “inactive”, and update the attribute processStatus of the <processManagement> resource to “Aborted”, thus aborting the process.

In the above step S202, the common service entity creates the advanced state resource as a sub-resource of the process management resource according to the request to create an advanced state resource. The association relationship between the advanced state resource created by it and the state resources and action resources in the process management resources is shown in FIG. 3C. For example, the advanced state resource can be linked to the state resources and action resources through the attribute stateAction. The manner in which how the advanced state resource is linked with the state resources and action resources is shown below referring to FIG. 3D, but those skilled in the art should understand that the embodiments of the present disclosure do not make limitations to how to link the advanced state resource with the state resources and action resources.

Referring to FIG. 3D, it schematically shows three modes in which the advanced state resource is linked with state resources and action resources.

For example, in Mode 1, in the above step S211, the application entity transmits a request to create an advanced state resource, wherein the advanced state resource is associated with a state resource of a plurality of state resources in a process management resource, and the advanced state resource is linked to at least one action resource of its associated state resource. Wherein, the request to create an advanced state resource includes an identifier of a state resource associated with the advanced state resource. As such, after receiving such a request for advanced state resource, in the above step S202, the common service entity creating the advanced state resource as the sub-resource of the process management resource further comprises: creating the advanced state resource as the sub-resource of the process management resource further comprises: creating a state resource associated with the advanced state resource as a sub-resource of the advanced state resource, wherein the state resource is linked to at least one action resource through a state action attribute.

In Mode 1, the advanced state resource includes a target state attribute (e.g., <targetState>) which indicates its associated state resource, and the advanced state resource is implicitly linked to at least one action resource of its associated state resource through the target state attribute. FIG. 3D shows that an advanced state resource is associated with a state resource with an identifier of state1. At this time, the CSE would simulate that the current intelligent scene has met all the conditions for executing state1, and would execute all the associated actions in state1 in turn. For example, it is assumed that state1 and its corresponding action resources indicate that: when the temperature sensor detects that the ambient temperature is greater than 31° C., the air conditioner is turned on (e.g., action1), the fan is adjusted to natural wind level 1 (e.g., action2) and the head-swing action is enabled (e.g., action3). At this time, the CSE would instruct not to detect whether the ambient temperature is greater than 31° C., but directly turn on the air conditioner, adjust the fan to natural wind level 1 and enable the head-swing action.

For example, in Mode 2, in the above step S211, the application entity transmits a request to create an advanced state resource, wherein the advanced state resource is associated with a state resource of a plurality of state resources in a process management resource, and the advanced state resource is linked to at least one action resource of its associated state resource. Wherein, the request to create an advanced state resource includes an identifier of a state resource associated with the advanced state resource and a set of identifiers of action resources, wherein the set of identifiers of the action resources is a subset of identifiers of all action resources included in the state resource associated with the advanced state resource. As such, after receiving such a request for advanced state resource, in the above step S202, the common service entity creating the advanced state resource as the sub-resource of the process management resource further comprises: creating an identifier of a state resource associated with the advanced state resource as an attribute of the advanced state resource; and creating a subset of action resources included in the state resource associated with the advanced state resource as sub-resources of the advanced state resource.

In Mode 2, the advanced state resource includes a target state attribute (e.g., <targetstate>) which indicates its associated state resource. And the advanced state resource includes a state action attribute through which at least one action resource of the associated state resource is explicitly linked. FIG. 3D shows that an advanced state resource is associated with a state resource with an identifier of state2. At this time, the CSE would simulate that the current intelligent scene has met all the conditions for executing the action action2 of state2, and would execute all the associated actions in state2 in turn. For example, it is assumed that state2 and its corresponding action resources indicate that: when the temperature sensor detects that the ambient temperature is less than 29° C., the air conditioner is turned off (action1), the fan is adjusted to natural wind level 4 (action2) and the head-swing action is disabled (action3). At this time, the CSE would instruct not to detect whether the ambient temperature is less than 31° C. and not to turn off the air conditioner, but directly adjust the fan to natural wind level 4 and disable the head-swing action.

For example, in Mode 3, in the above step S211, the application entity transmits a request to create an advanced state resource, wherein the advanced state resource is associated with a state resource of a plurality of state resources in a process management resource, and the advanced state resource is linked to at least one action resource of its associated state resource. Wherein, the request to create an advanced state resource includes an identifier of a state resource associated with the advanced state resource and an identifier of one of a plurality of action resources included in the state resource. As such, in the above step S202, the common service entity creating the advanced state resource as the sub-resource of the process management resource further comprises: creating an index pair consisting of an identifier of a state resource associated with the advanced state resource and an identifier of at least one action resource included in the state resource, as an attribute of the advanced state resource.

In Mode 3, the advanced state resource includes state action identifiers (e.g., <stateActionIDs>) which are a list of index pairs composed of the identifier of the state resource and the identifier of at least one action resource included in the state resource. An advanced state resource is explicitly linked to at least one action resource of its associate state resource through the state action attribute. FIG. 3D shows that an advanced state resource is associated with the state resource with the identifier of state2 and linked to the action resource action2 of the state resource state2. At this time, the CSE would simulate that the current intelligent scene has met all the conditions for executing the action action2 of state2, and would execute all the associated actions in state2 in turn. For example, it is assumed that state2 and its corresponding action resources indicate that: when the temperature sensor detects that the ambient temperature is less than 29° C., the air conditioner is turned off (action1), the fan is adjusted to natural wind level 4 (action2) and the head-swing action is disabled (action3). At this time, the CSE would instruct not to detect whether the ambient temperature is less than 31° C. and not to turn off the air conditioner, but directly adjust the fan to natural wind level 4 and disable the head-swing action.

For example, in Mode 1, Mode 2, and Mode 3, in the above-mentioned step S211, the application entity may also transmit a request to create an advanced state resource, wherein the request to create an advanced state resource includes a state transition attribute, wherein the state transition attribute indicates a condition for transition to a continuous state resource and the continuous state resource. In the above step S202, the common service entity creating the advanced state resource as the sub-resource of the process management resource further comprises: creating a state status attribute of the advanced state resource, wherein the state status attribute indicates whether the process management resource is processing the advanced state resource; and, creating a state transition attribute of the advanced state resource, wherein the state transition attribute indicates a condition for transition to a continuous state resource and the continuous state resource.

For example, in Mode 1, Mode 2, and Mode 3, the advanced state resource includes a current status (e.g., <currentstatus>) which indicates whether the advanced state is currently the active state of the process, that is, whether the process management resource is processing the advanced state resource. The values supported for this attribute include "active" and "inactive". The advanced state resource includes a state transition attribute (e.g., <stateTransitions>) which indicates a condition for a continuous state resource and the continuous state resource. For example, the state transition attribute includes a list of criteria for determining whether/when to transition from this state to another state. Each entry in the list is defined as an index pair consisting of the following two elements: evalCriteria: identifying the condition for state transition; next state: the resource identifier of the next <state> resource. If this <state> resource represents the last state in the process, this attribute should be NULL.

By utilizing the embodiments of the present disclosure, it becomes possible to simulate the fulfillment of a condition that triggers the operation of an action resource. This allows the user to visually observe the effects of triggering the operation of an action resource, without compromising the realization of other state resources and process control within the process management resource. The embodiments of this disclosure enable users to immediately observe the operations of various IoT devices that they have set up after completing the configuration of an intelligent scene. Based on this observation, users can determine whether further adjustments to the intelligent scene are necessary, thereby enhancing the efficiency of scene configuration and overall work efficiency. Furthermore, the embodiments of this disclosure also empower users to skip a certain state in the process and proceed to the next state in the event of an IoT device failure. This ensures that the intelligent scene remains uninterrupted despite any device malfunctions.

Figure 4:
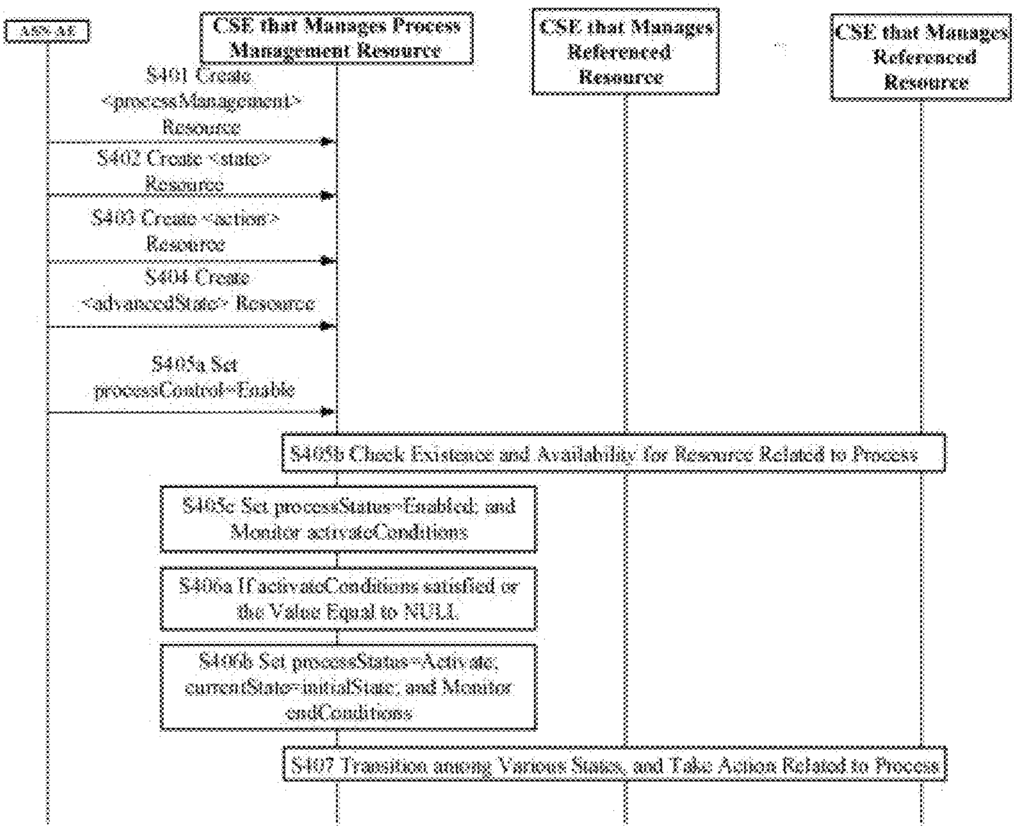
FIG. 4 shows another diagram of an interaction between a common service entity and an application entity according to an embodiment of the present disclosure.

FIG. 4 shows another diagram of an interaction between a common service entity and an application entity according to an embodiment of the present disclosure.

In step S401, an application entity (e.g., ASN-AE) creates a <processManagement> resource on the CSE, that is, under the <CSEBase> resource. For example, <processManagement> resources are created on a smart gateway such as CSE, and the CSE automatically executes a state activation change and the like.

In step S402, the application entity instructs the CSE to create all the <state> resources related to the process. The <state> resources are created as sub-resources of the <processManagement> resource.

In step S403, the application entity instructs the CSE to create <action> resources under the <state> resource, with each <action> resource corresponding to a respective <state> resource, and the <action> resources are linked with the <state> resource through the <state> resources/the attribute stateAction.

In step S404, the application entity instructs the CSE to create the above-mentioned advanced state resource <advancedState>. The <advancedState> resource is created as a sub-resource of the <processManagement> resource. The above process refers to the process described above, and will not be detailed here in the present disclosure.

In step S405*a*, the application entity instructs the CSE to enable the process by updating the attribute processControl of the <processManagement> resource to the value of "Enable". Optionally, the application entity instructs the CSE to enable the advanced state resource by updating the attribute advancedControl of the <processManagement> resource to the value of "Enable".

In step S405*b*, the common service entity verifies each resource defined in the process to confirm whether the resource exists and whether it can be accessed by the creator of the <processManagement> resource.

In step S405*c*, if the verification of the common service entity is successful, the common service entity should update the value of processStatus to "Enabled". Then, the common service entity starts to monitor the conditions defined in the attribute activateConditions of the <processManagement> resource.

In step S406*a*, the common service entity determines whether the conditions defined in the attribute activateConditions are met or whether the attribute activateConditions is NULL.

In step S406*b*, the common service entity sets the attribute processStatus of the <processManagement> resource to the value of "Activated" when it determines that the conditions defined in the attribute activateConditions are met or that the attribute activateConditions is NULL.

If <advancedState> is not NULL, and advancedControl is "True" or "enabled", the common service entity sets the attribute currentState to the value configured in the advancedState resource, and then the common service entity sets the attribute processStatus of the <processManagement> resource to "Activated".

If <advancedState> is NULL, or advancedControl is NULL or "disabled", the common service entity should also set the attribute currentState to the value configured in the attribute initialState.

At this time, the common service entity can stop monitoring the conditions defined in the attribute activateConditions and start to monitor the conditions defined in endConditions.

In step S407, if <advancedState> is not NULL, and advancedControl is "True" or "enabled", the host should start to process each <state> resource in the process from the state associated with the advancedState resource of the <processManagement> resource.

If <advancedState> is NULL, or advancedControl is "NULL" or "disabled", the common service entity should start to process each <state> resource in the process from the state defined by the attribute initialState of the <processManagement> resource.

When the execution condition of the corresponding <action> of the <state> resource is met, the common service entity can evaluate and execute the action linked through the attribute stateAction to the <state> resource. The common service entity should also monitor the state transition conditions defined in the attribute stateTransitions of the state. Whenever the common service entity detects a need for state transition according to the attribute stateTransitions defined in the current <state> resource, the common service entity should update the attribute currentState with the resource identifier of the next <state> resource.

For example, when invoking a <state> resource, the common service entity can perform the following operations.

First, the common service entity would set the value of the attribute stateStatus of the <state> resource indicated in the attribute currentState of the <processManagement> resource to "active".

Then, when the <state> resource is activated, the common service entity evaluates the attribute stateAction of the <state> resource. For an <action> resource with its attribute evalCriteria as NULL (i.e., an unconditional action), the common service entity would immediately execute the corresponding action defined by the <action> resource when transitioning to the <state> resource.

For an <action> resource with the attribute evalCriteria as not NULL (i.e. a conditional action), the common service entity would monitor the attribute evalCriteria of the <action> resource to determine whether/when to trigger and execute the action.

When the value of the attribute evalCriteria of <action> is NULL (i.e., the triggering condition for executing the action), the associated actions will be directly executed after entering the state; when the value of the attribute evalCriteria is not NULL, the change in information related to evalCriteria will continue to be monitored after entering the state.

Then, the common service entity monitors the criteria specified in the attribute stateTransitions of the <state> resource.

Finally, if it is detected that the common service entity meets one of the conditions defined in the attribute stateTransitions, the common service entity should update the stateStatus of the current <state> resource to "inactive", and update the currentState of the <processManagement> resource with the resource identifier of the next <state> resource. Then, the common service entity should transition to the next state.

If the application entity indicates to update the value of the attribute processControl to "Paused", the common service entity will update the value of the attribute processState to "Paused". When the value of the attribute processControl is updated to Enable, then this process control is reactivated. If the value of the attribute processControl is updated to Disable, it means that the common service entity should end the process control.

If the application entity instructs to update the attribute processControl of the <processManagement> resource to "Disabled", the common service entity would set the attribute processStatus to "Disabled". The common service entity would set the attribute stateStatus of all the <state> sub-resources to "inactive". The common service entity would set the attribute currentState to "NULL". The common service entity should stop monitoring the conditions defined in the attribute endConditions.

If the application entity indicates to update the value of the attribute processControl to "Paused", the common service entity will update the value of the attribute processState to "Paused". When the value of the attribute processControl is updated to Enable, then this process control is reactivated. If the value of the attribute processControl is updated to Disable, it means that the common service entity should end the process control.

When the triggering conditions in endConditions are met, or the common service entity detects that there is no subsequent state change to occur, the common service entity should set the value of the attribute processState to Completed, and set the values of the attribute stateStatus of all the <state> sub-resources to inactive. The common service entity sets currentState to NULL and stops monitoring the triggering conditions specified in endConditions.

The application entity can restart the completed process by instructing to update the process control to "Enable".

When processStatus is "Disabled", the common service entity should allow addition, modification, or deletion of <state> sub-resources from the process. Otherwise, the host CSE will reject the request for addition, modification, or deletion of <state> resources from the process.

When processStatus is "Disabled", the common service entity should allow update of the attributes activateConditions, endConditions and initialState of the <processManagement> resource. Otherwise, the common service entity should reject the request for update of such attributes.

Only when processStatus is "Disabled" can the common service entity allow the creation, update and deletion of <state> sub-resources, otherwise it does not allow. It is the same case with the values of the attributes activateConditions, endConditions and initialState.

When processStatus is changed from "Disabled" to "Enabled", the common service entity should check whether all the required resources related to the process exist, and the creator of the <processManagement> resource has the necessary permissions to perform process-related operations on such resources. The necessary permissions include the RETRIEVE permission as well as the CREATE, UPDATE, and DELETE permissions (if any/if applicable) to the resources (e.g., the process contains a <action> resource, resulting in an UPDATE operation on the target resource). In addition, the common service entity should also check whether the creator of the <processManagement> resource has the necessary permissions to operate on all the process-related resources during the management process by the common service entity. If, at any time, the common service entity determines that the creator does not have sufficient permissions, the common service entity should not enable the process when the process has not been enabled, and aborts the process when the process is enabled or activated.

Figure 5:
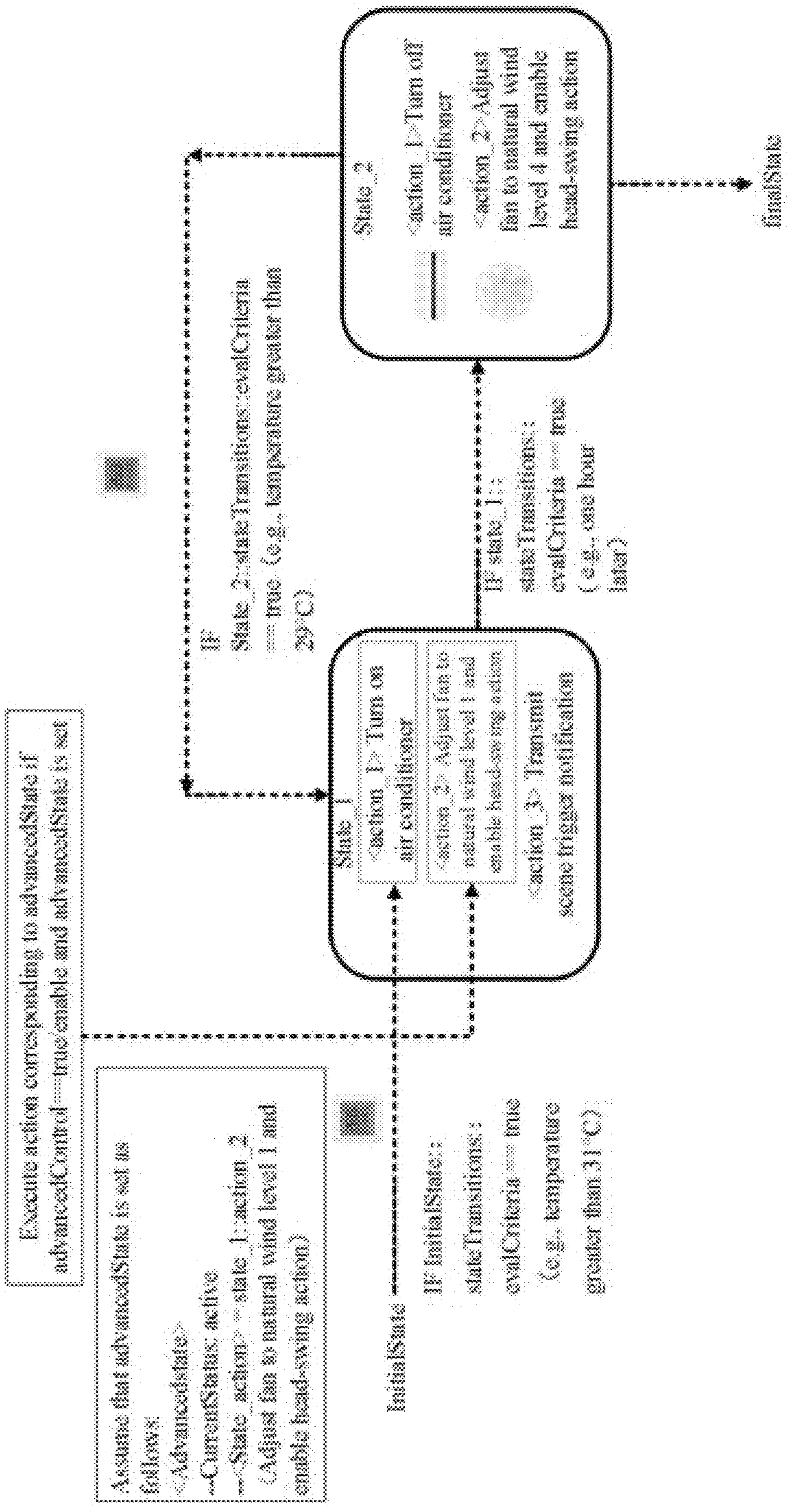
FIG. 5 shows a flowchart for process control conducted utilizing advanced state resources according to an embodiment of the present disclosure.

FIG. 5 shows a flowchart for process control conducted utilizing advance state resources according to an embodiment of the present disclosure.

For example, in the intelligent scene shown in FIG. 1C, the user completes the following settings: when the temperature sensor detects that the ambient temperature is greater than 31° C. (e.g., state_1), the air conditioner is turned on (e.g., state_1::action_1), the fan is adjusted to natural wind level 1 and the head-swing action is enabled (e.g., state_1::action_2), and a scene trigger notification is transmitted to the terminal device (e.g., mobile phone) (e.g., state_1::action_3). One hour later, the temperature sensor performs detection again, and when the temperature sensor detects that the ambient temperature is less than 29° C. (e.g., state_2), the air conditioner is turned off (e.g., state_2::action_1), and the fan is adjusted to natural wind level 4 (e.g., state_2::action_2). After finishing setting the intelligent scene, an advanced state resource is set and enabled, indicating to simulate that the triggering condition for state_1 has been met, and the air conditioner has been turned on (i.e., the state_1::action_1 has been executed). At this time, if the CSE determines that the value of advancedControl is "true" or "enable", the CSE will adjust the fan to natural wind level 1 and enable the head-swing action.

At this time, the user can determine that the current intelligent scene is set successfully. If the CSE fails to adjust the fan successfully, the intelligent scene setting is wrong or failed.

FIGS. 6A to 6D show diagrams of changes in an interface for a mobile terminal to set an advance state resource according to an embodiment of the present disclosure. FIG. 6E shows a flowchart for a method 60 performed by an IoT terminal according to an embodiment of the present disclosure. The mobile terminal has an IoT management APP installed thereon.

The method 60 according to an embodiment of the present disclosure includes the following steps.

In step S601, a plurality of states in a set IoT process and actions associated with the plurality of states are displayed.

For example, the displaying the plurality of states in the set IoT process and the actions associated with the plurality of states further comprises: displaying an IoT intelligent scene setting interface, wherein the IoT intelligent scene setting interface includes a plurality of set IoT processes; and in response to triggering a selection of one of the plurality of IoT processes, displaying a detailed setting page for further setting the selected IoT process and displaying a plurality of states in the IoT process and a plurality of actions associated with the plurality of states on the detailed setting page.

Figure 6A:
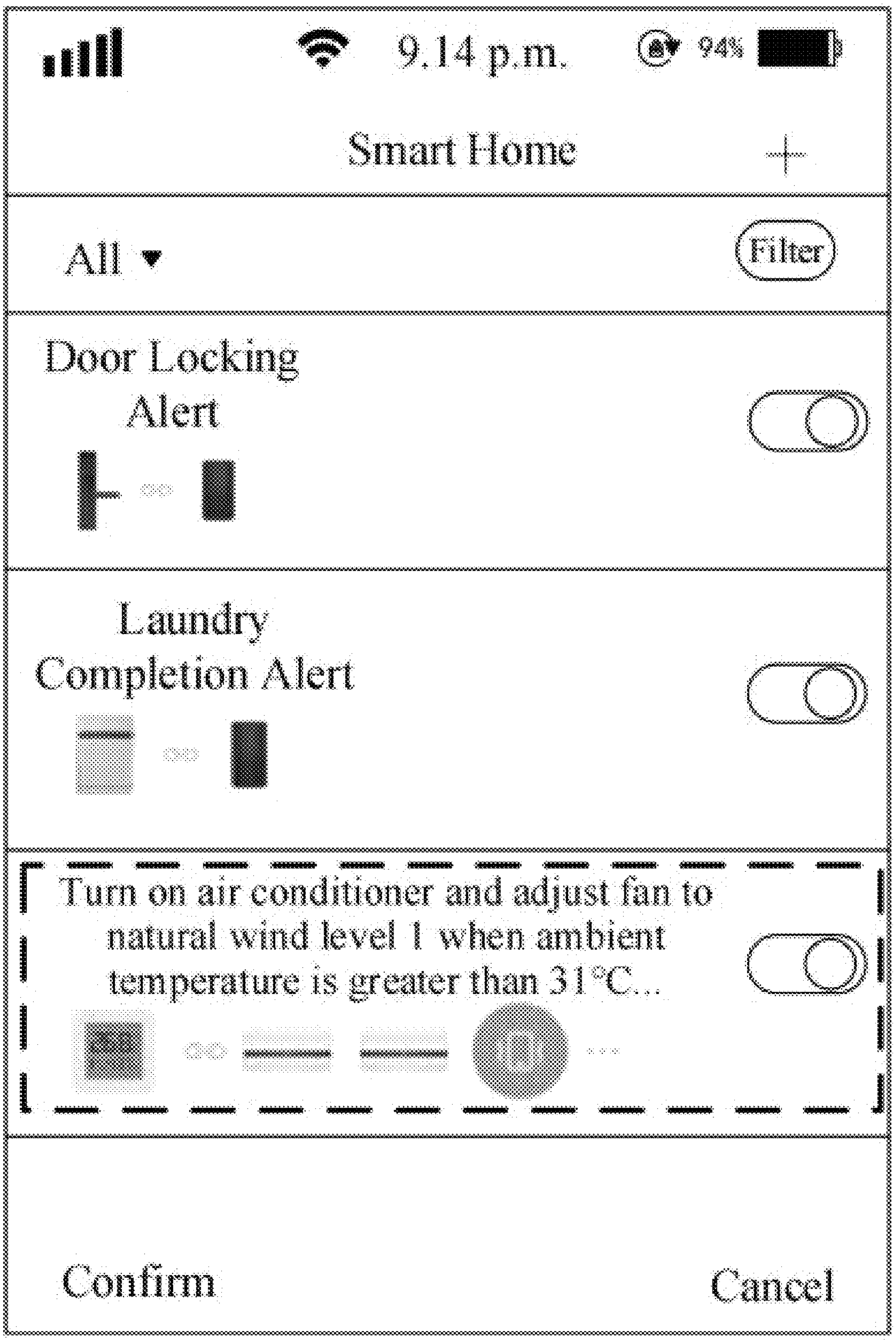
FIGS. 6A to 6D show diagrams of changes in an interface for a mobile terminal to set an advanced state resource according to an embodiment of the present disclosure.

FIG. 6A shows an example of an IoT intelligent scene configuration interface, on which a plurality of IoT processes are displayed. For example, a first IoT process may be to prompt the user that the door has been locked after locking the door. A second IoT process may be to prompt the user that the laundry has been completed after completing the laundry. A third IoT process may be that: when the temperature sensor detects that the ambient temperature is greater than 31° C., the air conditioner is turned on, the fan is adjusted to natural wind level 1 and the head-swing action is enabled, and a scene trigger notification is transmitted to the terminal device (e.g., mobile phone APP). One hour later, the temperature sensor performs detection again, and when the temperature sensor detects that the ambient temperature is less than 29° C., the air conditioner is turned off and the fan is adjusted to natural wind level 4. A user's long press/click on a process in FIG. 1A (e.g., the area within the dotted box) can trigger the selection of one of the plurality of IoT processes, and at this time, a dialog box can be triggered for whether to further set the IoT process.

Figure 6B:
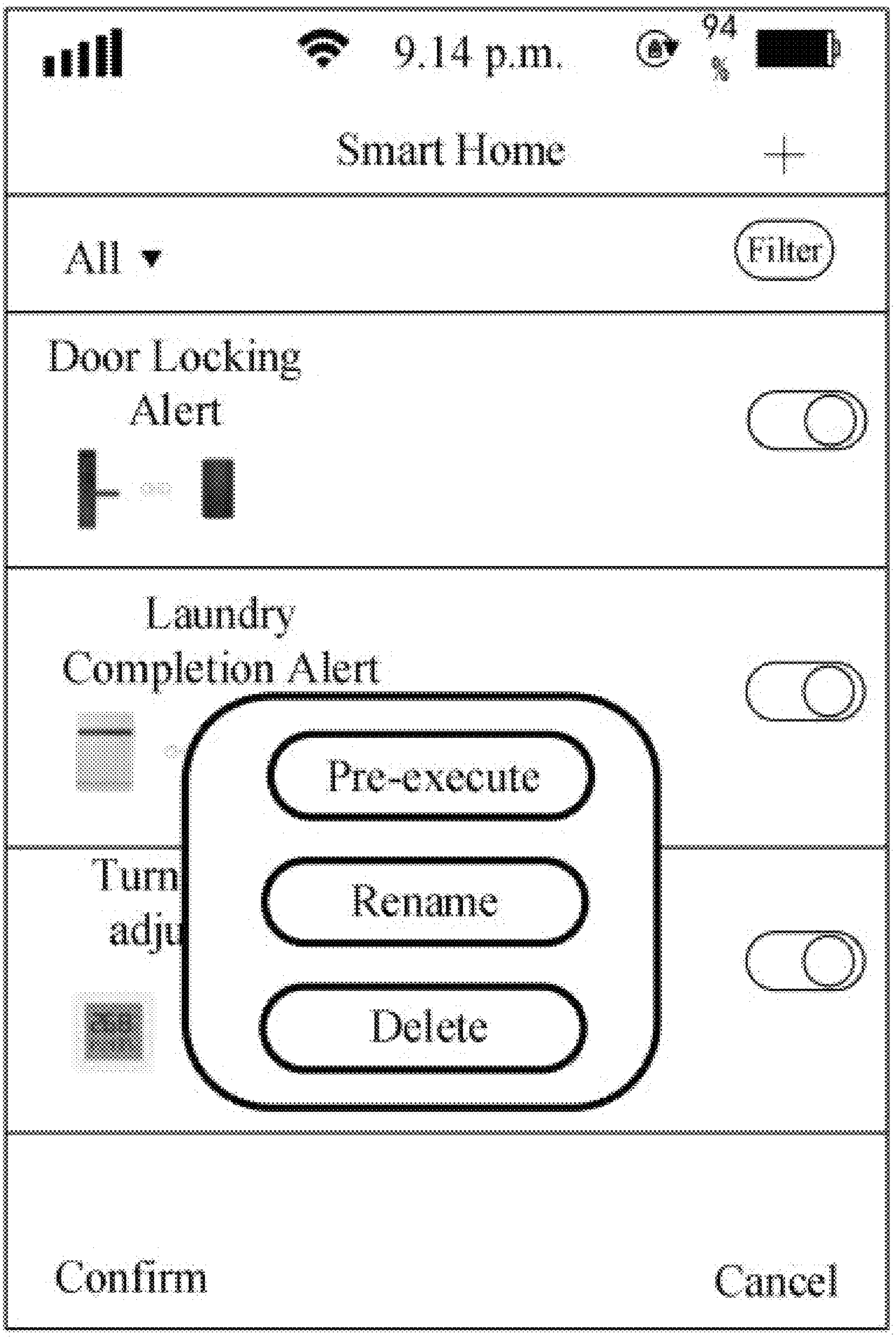

As shown in FIG. 6B, after the user triggers the display of the detailed setting page, the terminal APP will pop up a dialog box, asking whether to set the scene for further pre-execution. At this time, if the user clicks on the pre-execution button, the setting of advanced resource will be triggered.

In step S602, information for adjusting IoT process is acquired, wherein the information for adjusting IoT process instructs the IoT process to enter one of the plurality of states.

For example, acquiring the information for adjusting IoT process further comprises: in response to triggering a selection of one of the plurality of states in the IoT process, acquiring the information for adjusting IoT process, wherein the information for adjusting IoT process instructs the IoT process to enter the selected state.

For example, the acquiring the information for adjusting IoT process further comprises: in response to triggering a selection of one of the plurality of actions in the IoT process, acquiring the information for adjusting IoT process, wherein the information for adjusting IoT process instructs the IoT process to process the selected action.

Figure 6C:
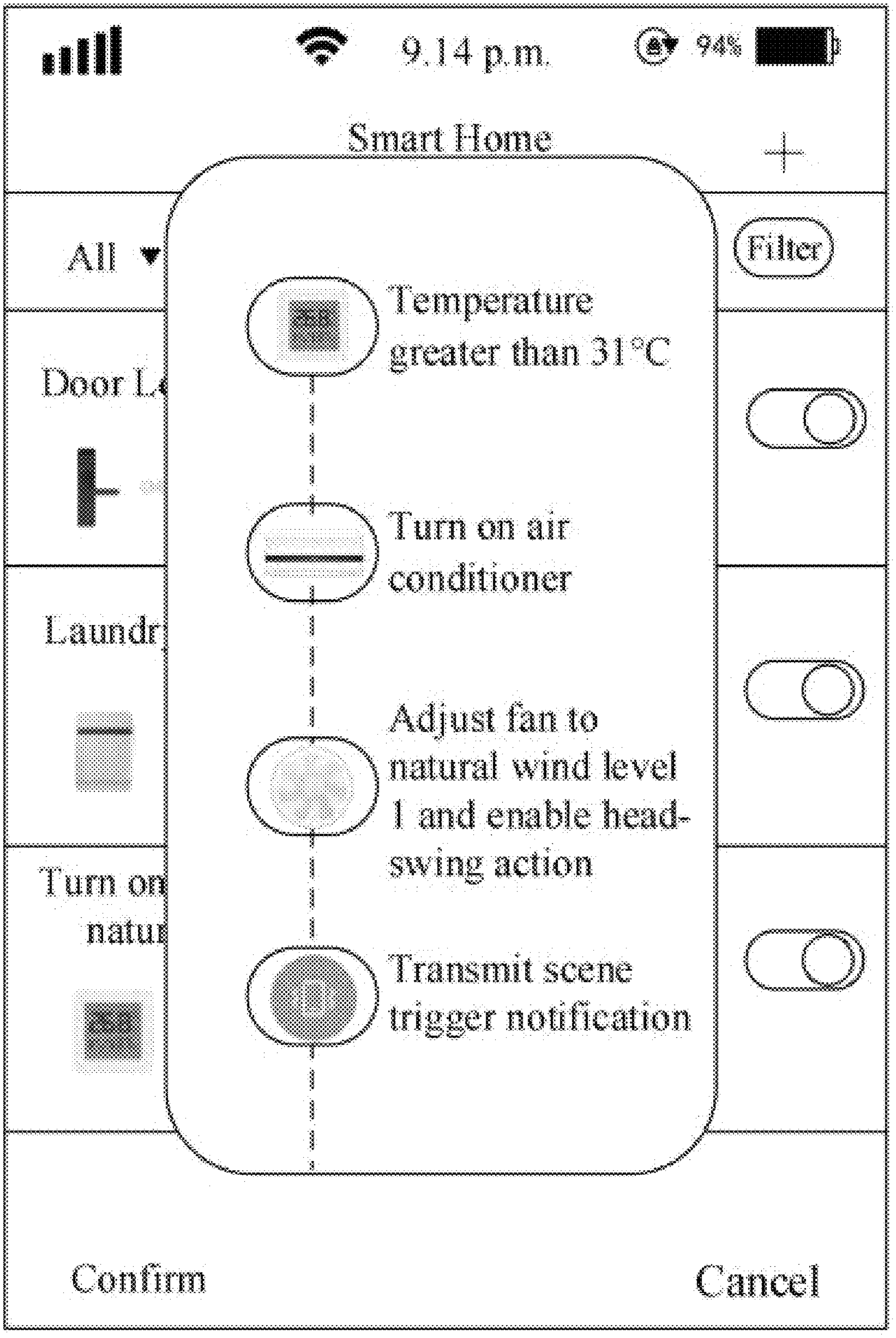

As shown in FIG. 6C, the terminal APP lists the step-by-step execution steps in the IoT process according to the intelligent scene preset by the user. The interface that lists the step-by-step execution steps in the IoT process is the detailed setting page for further setting the selected IoT process.

Figure 6D:
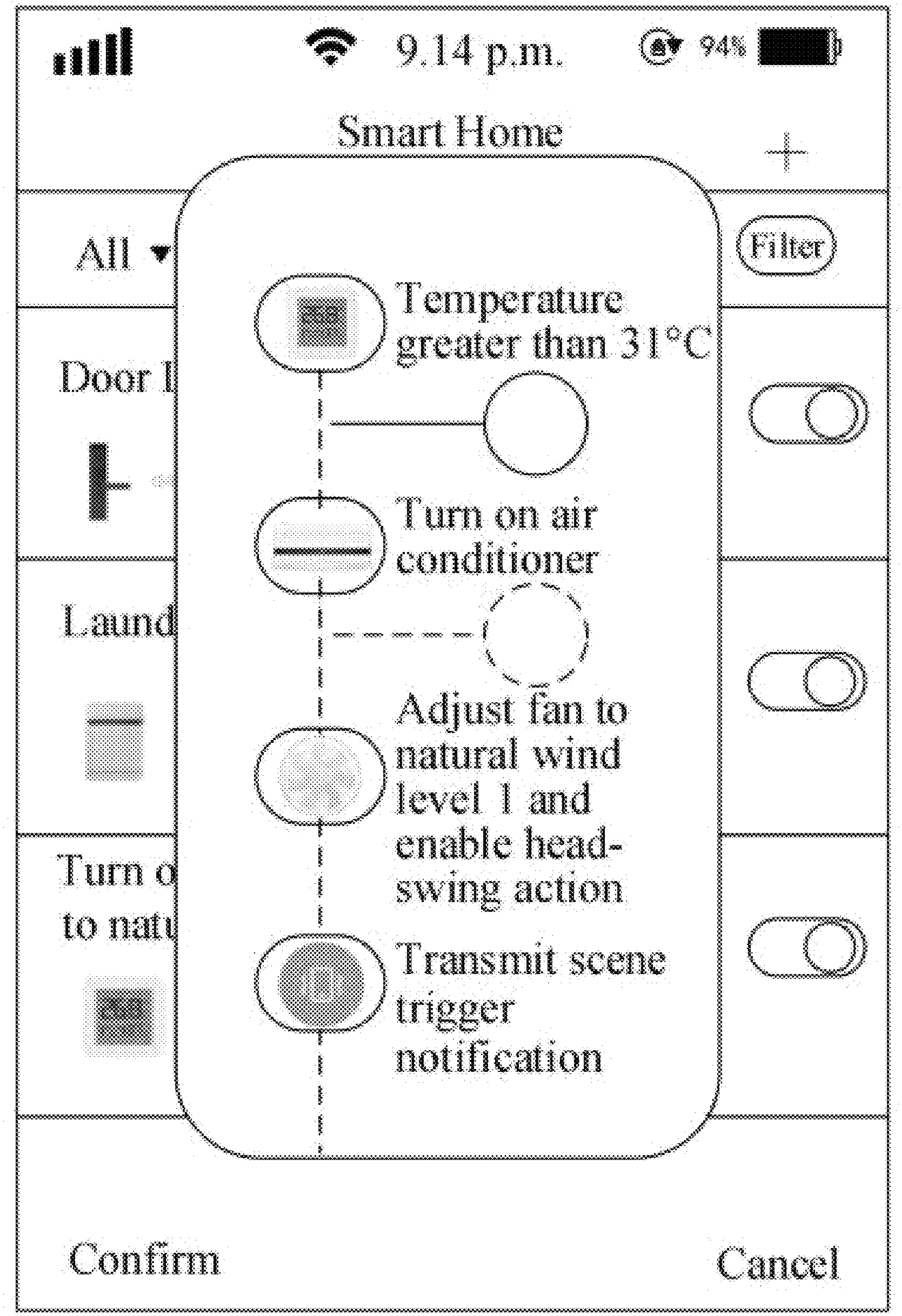
Figure 6E:
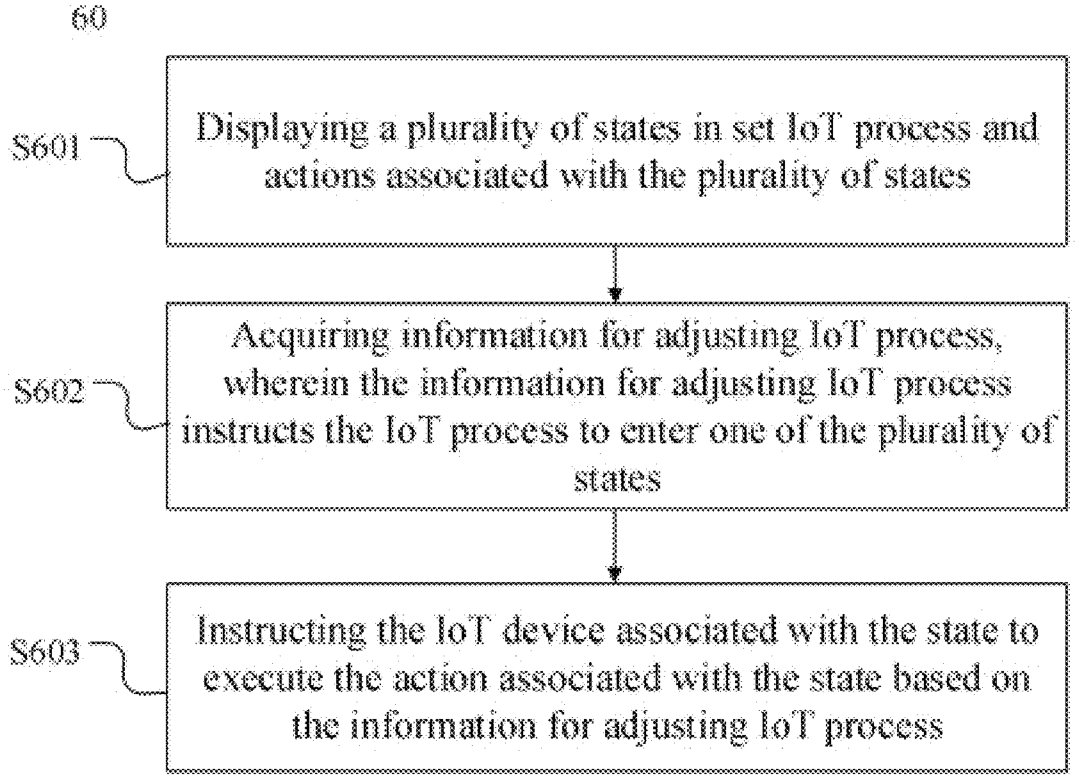
FIG. 6E shows a flowchart for a method performed by an IoT terminal according to an embodiment of the present disclosure.

As shown in FIG. 6D, the user drags the black check box up and down with his finger on the screen, and selects the pre-executed cut-in position as needed, thereby triggering the selection of one of a plurality of states in the IoT process, or the selection of one of a plurality of actions in the IoT process. Take the solid box as an example, it indicates that it is simulated that, the condition that the temperature is greater than 31° C. has been met, and then the air conditioner is directly turned on. Take the dotted box as an example, it indicates that it is simulated that, the condition that the air conditioner has been turned on has been met, and then the adjustment of the fan is directly enabled. Through the black check box, the terminal APP acquires the information for adjusting the IoT process.

In step S603, the IoT device associated with the state is instructed to execute an action associated with the state based on the information for adjusting IoT progress.

For example, the instructing the IoT device associated with the state to execute the action associated with the state further comprises: transmitting a request to create an advanced state resource to a service gateway of IoT, so as to instruct the IoT device associated with the state to execute the action associated with the state.

Thus, the embodiments of the present disclosure also provide an IoT terminal, which includes a display and a processor. Wherein, the display is configured to display a plurality of states in a set IoT process and actions associated with the plurality of states. The processor is configured to acquire information for adjusting IoT process, wherein the information for adjusting IoT process instructs the IoT process to enter one of the plurality of states, and instruct the IoT device associated with the state to execute an action associated with the state based on the information for adjusting IoT progress.

Figure 7:
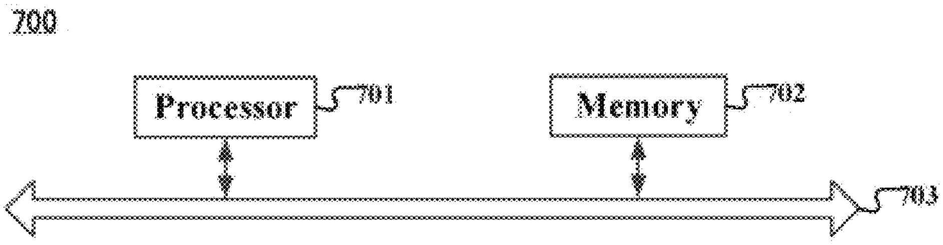
FIG. 7 shows a diagram of a structure of an electronic device according to an embodiment of the present disclosure.

FIG. 7 shows a diagram of a structure of an electronic device 700 according to an embodiment of the present disclosure.

Referring to FIG. 7, the electronic device 700 may include a processor 701 and a memory 702. Both the processor 701 and the memory 702 may be connected by a bus 703. The virtual resource transfer device 700 may be a Tower Server, a Rack Server, a Blade Server, a Cabinet Server, and the like.

The processor 701 can execute various actions and processes according to the programs stored in the memory 702. Specifically, the processor 701 may be an integrated circuit chip with signal processing capability. The above processor may be general processor, digital signal processor (DSP), application specific integrated circuit (ASIC), field programmable gate array (FPGA) or other programmable logic device, discrete gate or transistor logic device, or discrete hardware component. The various methods, steps and logic blocks disclosed in the embodiments of the present application can be implemented or executed. The general processor may be either a microprocessor or any conventional processor, and may be of either X86 architecture or ARM architecture.

The memory 702 has stored thereon computer instructions, which when executed by the processor 701, implements the above-mentioned method 200 for transmitting cross-resource event notifications. The memory 702 may be volatile memory or nonvolatile memory, or may include both. The nonvolatile memory may be read-only memory (ROM), programmable read-only memory (PROM), erasable programmable read-only memory (EPROM), electrically erasable programmable read-only memory (EEPROM) or flash memory. The volatile memory may be a random access memory (RAM), which acts as an external cache. By way of illustration but not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous link dynamic random access memory (SLDRAM) and direct rambus random access memory (DR RAM). It should be noted that the memories of the methods described herein are intended to include, but are not limited to, these and any other suitable types of memories.

The embodiments of the present disclosure also provide an apparatus for process control performed by a common service entity, comprising: a receiving module for receiving a request to create an advanced state resource, wherein the advanced state resource is associated with a state resource of a plurality of state resources in a process management resource, and the advanced state resource is linked to at least one action resource of its associated state resource; a creating module for creating the advanced state resource as a sub-resource of the process management resource according to the request to create an advanced state resource; and an activating module for processing the process management resource, and setting a value of a current state attribute in the process management resource as an identifier of a state resource associated with the advanced state resource.

The embodiments of the present disclosure provide an apparatus for process control performed by an application entity, comprising: a transmitting module for transmitting a request to create an advanced state resource, wherein the advanced state resource is associated with a state resource of a plurality of state resources in a process management resource, and the advanced state resource is linked to at least one action resource of its associated state resource; a receiving module for receiving a response to create an advanced state resource, wherein the response to create an advanced state resource indicates that the advanced state resource is created as a sub-resource of the process management resource.

The embodiments of the present disclosure provide an IoT system for process control comprising an application entity and a common service entity, and the system is configured to: transmitting, by an application entity to a common service entity, a request to create a process management resource; receiving, by the common service entity, the request to create a process management resource, and creating the process management resource according to the request to create a process management resource; transmitting, by the application entity to the common service entity, a request to create a plurality of state resources; receiving, by the common service entity, the request to create a plurality of state resources, and creating the plurality of state resources as sub-resources of the process management resource according to the request to create a plurality of state resources; transmitting, by the application entity to the common service entity, a request to create at least one action resource, wherein the at least one action resource corresponds to one of the plurality of state resources; receiving, by the common service entity, the request to create at least one action resource, and linking the at least one action resource to its corresponding state resource according to the request to create at least one action resource; transmitting, by the application entity to the common service entity, a request to create an advanced state resource, wherein the advanced state resource is associated with a state resource of a plurality of state resources in a process management resource, and the advanced state resource is linked to at least one action resource of its associated state resource; receiving, by the common service entity, the request to create an advanced state resource, and creating the advanced state resource as a sub-resource of the process management resource according to the request to create an advanced state resource; and processing, by the common service entity, the process management resource, and setting a value of a current state attribute in the process management resource as an identifier of a state resource associated with the advanced state resource.

The present disclosure also provides a computer-readable storage medium, having stored thereon computer instructions, which when executed by a processor, can implement the above method. Similarly, the computer-readable storage medium in the embodiments of the present disclosure may be volatile memory or nonvolatile memory, or may include both. It should be noted that the computer-readable storage media described herein are intended to include, but are not limited to, these and any other suitable types of memory.

It should be noted that the flowcharts and block diagrams in the accompanying drawings illustrate implementable architectures, functionalities and operations of systems, methods and computer program products according to various embodiments of the present disclosure. In this regard, each block in the flowchart or block diagram may represent a module, a segment, or a part of code that contains one or more executable instructions for implementing specified logical functions. It should also be noted that in some alternative implementations, the functions noted in the blocks may occur in a different order than that noted in the accompanying drawings. For example, two blocks shown in succession may actually be executed substantially in parallel, and sometimes they may be executed in a reverse order, depending on the functionalities involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions.

In general, various example embodiments of the present disclosure may be implemented in hardware or dedicated circuit, software, firmware, logic, or any combination thereof. Certain aspects may be implemented in hardware, whereas other aspects may be implemented in firmware or software that may be executed by a controller, microprocessor or other computing device. When various aspects of the embodiments of the present disclosure are illustrated or described as block diagrams, flowcharts, or represented using some other graphics, it will be understood that blocks, apparatuses, systems, techniques, or methods described herein may be implemented in hardware, software, firmware, dedicated circuit or logic, general-purpose hardware or controller or other computing device, or some combination thereof, as non-limiting examples.

The exemplary embodiments of the present invention described in detail above are merely illustrative, but not restrictive. Those skilled in the art should understand that various modifications and combinations can be made to these embodiments or the features thereof without departing from the principle and spirit of the present invention, and such modifications should fall within the scope of the present invention.

What is claimed is:

1. A process control method performed by a common service entity, comprising:

receiving a request to create an advanced state resource, wherein the advanced state resource is associated with a state resource of a plurality of state resources in a process management resource, and the advanced state resource is used to simulate that the condition for triggering an operation of an action resource has been satisfied in advance;

creating the advanced state resource as a sub-resource of the process management resource according to the request to create an advanced state resource; and processing the process management resource, and setting a value of a current state attribute in the process management resource as an identifier of a state resource associated with the advanced state resource.

2. The process control method according to claim 1, wherein the request to create an advanced state resource further includes an advanced control attribute corresponding to the advanced state resource, and the setting of the value of the current state attribute in the process management resource as the identifier of the state resource associated with the advanced state resource further comprises:

setting the value of the current state attribute in the process management resource as a value corresponding to the advanced state resource in a case that the advanced control attribute indicates that the advanced state resource is enabled; and setting the value of the current state attribute in the process management resource as a value of an initial state attribute in the process management resource in a case that the advanced control attribute indicates that the advanced state resource is disabled.

3. The process control method according to claim 1, wherein creating the advanced state resource as the sub-resource of the process management resource further comprises:

creating a state resource associated with the advanced state resource as a sub-resource of the advanced state resource, wherein the state resource is linked to at least one action resource through a state action attribute.

4. The process control method according to claim 1, wherein creating the advanced state resource as the sub-resource of the process management resource further comprises:

creating an identifier of a state resource associated with the advanced state resource as an attribute of the advanced state resource; and creating a subset of action resources included in the state resource associated with the advanced state resource as sub-resources of the advanced state resource.

5. The process control method according to claim 1, wherein creating the advanced state resource as the sub-resource of the process management resource further comprises:

creating an index pair consisting of an identifier of a state resource associated with the advanced state resource and an identifier of at least one action resource included in the state resource, as an attribute of the advanced state resource.

6. The process control method according to claim 1, wherein creating the advanced state resource as the sub-resource of the process management resource further comprises:

creating a state status attribute of the advanced state resource, wherein the state status attribute indicates whether the process management resource is processing the advanced state resource; and creating a state transition attribute of the advanced state resource, wherein the state transition attribute indicates a condition for transition to a continuous state resource and the continuous state resource.

7. The process control method according to claim 1, wherein, before receiving the request to create an advanced state resource, the method further comprises:

receiving a request to create a process management resource, and creating the process management resource according to the request to create a process management resource;

receiving a request to create a plurality of state resources, and creating the plurality of state resources as sub-resources of the process management resource according to the request to create a plurality of state resources;

receiving a request to create at least one action resource, wherein the at least one action resource corresponds to one of the plurality of state resources; and linking the at least one action resource to its corresponding state resource according to the request to create at least one action resource.

8. The process control method according to claim 7, wherein at least one action resource of the state resource associated with the advanced state resource includes a target resource and a target operation, and the method further comprises: triggering a target operation for the target resource.

9. A method performed by an Internet of Things IoT terminal, comprising:

displaying a plurality of states in a set IoT process and actions associated with the plurality of states;

acquiring information for adjusting IoT process, wherein the information for adjusting IoT process instructs the IoT process to advance into one of the plurality of states for skipping at least one state of the plurality of states; and instructing the IoT device associated with the state to execute an action associated with the state based on the information for adjusting IoT process.

10. The method according to claim 9, wherein the displaying the plurality of states in the set IoT process and the actions associated with the plurality of states further comprises:

displaying an IoT intelligent scene setting interface, wherein the IoT intelligent scene setting interface includes a plurality of set IoT processes; and in response to triggering a selection of one of the plurality of IoT processes, displaying a detailed setting page for further setting the selected IoT process, and displaying a plurality of states in the IoT process and a plurality of actions associated with the plurality of states on the detailed setting page.

11. The method according to claim 10, wherein the acquiring the information for adjusting IoT process further comprises:

in response to triggering a selection of one of the plurality of states in the IoT process, acquiring the information for adjusting IoT process, wherein the information for adjusting IoT process instructs the IoT process to enter the selected state; or in response to triggering a selection of one of the plurality of actions in the IoT process, acquiring the information for adjusting IoT process, wherein the information for adjusting IoT process instructs the IoT process to process the selected action.

12. The method according to claim 10, wherein the instructing the IoT device associated with the state to execute the action associated with the state further comprises:

transmitting a request to create an advanced state resource to a service gateway of IoT, so as to instruct the IoT device associated with the state to execute the action associated with the state.

13. The method according to claim 12, wherein the advanced state resource is associated with a state resource of a plurality of state resources in a process management resource; and the method further comprises:

receiving a response to create an advanced state resource, wherein the response to create an advanced state resource indicates that the advanced state resource is created as a sub-resource of the process management resource.

14. The method according to claim 13, wherein the request to create an advanced state resource further includes an advanced control attribute corresponding to the advanced state resource, and the advanced control attribute indicates that the advanced state resource is enabled or disabled.

15. The method according to claim 13, wherein the request to create an advanced state resource includes an identifier of a state resource associated with the advanced state resource.

16. The method according to claim 13, wherein the request to create an advanced state resource includes an identifier of a state resource associated with the advanced state resource and a set of identifiers of action resources, wherein the set of identifiers of the action resources is a subset of identifiers of all action resources included in the state resource associated with the advanced state resource.

17. The method according to claim 13, wherein the request to create an advanced state resource includes an identifier of a state resource associated with the advanced state resource and an identifier of one of a plurality of action resources included in the state resource.

18. The method according to claim 13, wherein the request to create an advanced state resource further includes a state transition attribute, wherein, the state transition attribute indicates a condition for transition to a continuous state resource and the continuous state resource.

19. A process control method for Internet of Things IoT, comprising:

transmitting, by an application entity to a common service entity, a request to create a process management resource;

receiving, by the common service entity, the request to create a process management resource, and creating the process management resource according to the request to create a process management resource;

transmitting, by the application entity to the common service entity, a request to create a plurality of state resources;

receiving, by the common service entity, the request to create a plurality of state resources, and creating the plurality of state resources as sub-resources of the process management resource according to the request to create a plurality of state resources;

transmitting, by the application entity to the common service entity, a request to create at least one action resource, wherein the at least one action resource corresponds to one of the plurality of state resources;

receiving, by the common service entity, the request to create at least one action resource, and linking the at least one action resource to its corresponding state resource according to the request to create at least one action resource;

transmitting, by the application entity to the common service entity, a request to create an advanced state resource, wherein the advanced state resource is associated with a state resource of a plurality of state resources in a process management resource, and the advanced state resource is used to simulate that the condition for triggering an operation of an action resource has been satisfied in advance;

receiving, by the common service entity, the request to create an advanced state resource, and creating the advanced state resource as a sub-resource of the process management resource according to the request to create an advanced state resource; and processing, by the common service entity, the process management resource, and setting a value of a current state attribute in the process management resource as an identifier of a state resource associated with the advanced state resource.

20. The process control method according to claim 19, wherein at least one action resource of the state resource associated with the advanced state resource includes a target resource and a target operation, and the method further comprises: triggering a target operation for the target resource.

* * * * *